United States Patent
Ducellier et al.

(10) Patent No.: US 11,929,785 B2
(45) Date of Patent: Mar. 12, 2024

(54) TUNABLE AND POLARIZATION INSENSITIVE OPTICAL COMMUNICATION SYSTEM

(71) Applicant: HONEYWELL LIMITED HONEYWELL LIMITÉE, Mississauga (CA)

(72) Inventors: Thomas Ducellier, Ottawa (CA); Hugh Podmore, Toronto (CA); Alan Scott, Arnprior (CA)

(73) Assignee: HONEYWELL LIMITED HONEYWELL LIMITÉE, Mississauga (CA)

( * ) Notice: Subject to any disclaimer, the term of this patent is extended or adjusted under 35 U.S.C. 154(b) by 30 days.

(21) Appl. No.: 17/716,886

(22) Filed: Apr. 8, 2022

(65) Prior Publication Data

US 2023/0327772 A1    Oct. 12, 2023

(51) Int. Cl.
    *H04B 10/50* (2013.01)
    *H04B 10/294* (2013.01)

(52) U.S. Cl.
    CPC ....... *H04B 10/503* (2013.01); *H04B 10/2941* (2013.01); *H04B 10/506* (2013.01)

(58) Field of Classification Search
    CPC . H04B 10/503; H04B 10/2941; H04B 10/506
    USPC .......................................................... 398/201
    See application file for complete search history.

(56) References Cited

U.S. PATENT DOCUMENTS

| | | |
|---|---|---|
| 3,670,166 A | 6/1972 | Kaminow |
| 4,687,281 A | 8/1987 | Gross |
| 5,479,082 A | 12/1995 | Calvani et al. |
| 5,740,288 A | 4/1998 | Pan |
| 6,249,364 B1 | 6/2001 | Martin et al. |
| 6,414,769 B1 | 7/2002 | Meli et al. |
| 6,415,074 B1 | 7/2002 | Donald et al. |
| 6,587,266 B2 | 7/2003 | Tai et al. |
| 6,963,675 B2 | 11/2005 | Watanabe |
| 7,593,641 B2 * | 9/2009 | Tegge, Jr. ............ H04B 10/118 398/118 |
| 7,627,251 B2 | 12/2009 | Walther et al. |
| 8,417,118 B2 | 4/2013 | Bai |
| 8,559,821 B2 | 10/2013 | Wen et al. |
| 9,354,389 B2 | 5/2016 | Doctor |

(Continued)

FOREIGN PATENT DOCUMENTS

| WO | 2001/028137 A1 | 4/2001 | |
|---|---|---|---|
| WO | WO-2021211224 A1 * | 10/2021 | ............. G01S 17/34 |

OTHER PUBLICATIONS

Cyrus et al; A reconfigurable all-fiber polarization-diversity coherent Doppler lidar: principles and numerical simulations ; Oct. 2015; Applied Optics; pp. 1-12; (Year: 2015).*

(Continued)

*Primary Examiner* — Amritbir K Sandhu

(57) ABSTRACT

An optical communication system which is tunable and polarization insensitive is provided herein. The optical communication system may comprise an optical bench coupling an optical transmit pathway and an optical receiving pathway to an external pathway. The optical bench includes a polarization insensitive optical circulator. The system may further include a tunable component positioned along the optical receiving pathway, and a controller coupled to the tunable component.

15 Claims, 17 Drawing Sheets

(56) References Cited

U.S. PATENT DOCUMENTS

| | | | |
|---|---|---|---|
| 9,413,132 | B2 | 8/2016 | Levy et al. |
| 9,647,426 | B1 * | 5/2017 | Fish .................. H01S 5/5009 |
| 9,755,759 | B2 | 9/2017 | Ciaramella et al. |
| 10,404,403 | B2 | 9/2019 | Troeltzsch et al. |
| 10,461,854 | B2 | 10/2019 | Wang |
| 10,469,195 | B2 | 11/2019 | Sahni et al. |
| 10,735,124 | B2 | 8/2020 | Ji et al. |
| 10,746,933 | B2 | 8/2020 | Guo et al. |
| 10,816,873 | B2 | 10/2020 | Takasaka |
| 11,095,390 | B2 | 8/2021 | Dupuis et al. |
| 11,159,235 | B1 | 10/2021 | Nykolak et al. |
| 11,190,293 | B1 * | 11/2021 | Ducellier ............ H04J 14/0227 |
| 2002/0118359 | A1 | 8/2002 | Fairley et al. |
| 2004/0081466 | A1 * | 4/2004 | Walther ............. H04B 10/1143 398/152 |
| 2004/0109655 | A1 | 6/2004 | Dennis et al. |
| 2007/0086784 | A1 * | 4/2007 | Lee ..................... H04L 7/0075 398/152 |
| 2009/0219960 | A1 | 9/2009 | Uberna et al. |
| 2012/0206792 | A1 | 8/2012 | Powers |
| 2013/0093410 | A1 | 4/2013 | Eriksson et al. |
| 2014/0241731 | A1 * | 8/2014 | Peach .................. H04B 10/11 398/139 |
| 2016/0274305 | A1 | 9/2016 | Ye et al. |
| 2018/0375583 | A1 | 12/2018 | Wang et al. |
| 2021/0242939 | A1 | 8/2021 | Ducellier et al. |
| 2022/0146815 | A1 * | 5/2022 | Lu ........................ H05B 1/023 |
| 2022/0181837 | A1 * | 6/2022 | Delavaux ............ H01S 3/08027 |

OTHER PUBLICATIONS

Abu et al; A Contemporary Survey on Free Space Optical Communication: Potential, Technical Challenges, Recent Advances and Research Direction; Nov. 2020; pp. 1-59. (Year: 2020).*

Masafumi et al; High-isolation polarization insensitive optical circulator for advanced optical communication systems ;1992; NTT transmission Systems Laboratories; pp. 1-4. (Year: 1992).*

Cyrus1 et al; An all-fiber image-reject homodyne coherent Doppler wind lidar; Oct. 2014; Optical Society of America; pp. 1-15. (Year: 2014).*

Lambda Research Optics, Inc., Glan Thompson Polarizing Beamsplitter Cubes (CGTS), product specs, accessed Jan. 13, 2020 <https://www.lambda.cc/product/glan-thompson-polarizing-beamsplitter-cubes-cgts> (3 pages).

Thorlabs, Inc., "Mounted Zero-Order Quarter-Wave Plates", product specs, accessed Jan. 13, 2020 <https://www.thorlabs.com/newgrouppage9.cfm?objectgroup_id=7234> (4 pages).

Thorlabs, Inc., "Faraday Rotators", product specs, accessed Jan. 13, 2020 <https://www.thorlabs.com/newgrouppage9.cfm?objectgroup_id=12684&gclid=CjwKCAjwxaXtBRBbEiwAPqPxcM8F7JNC4fBGBj8u2dSF53x8kfgsAJQ1uAca1JZuqkfznAk8Rxf8eRoCAz4QAvD_BwE> (2 pages).

I&Optics Ltd., "Free Space Faraday Rotator", product specs, 2016 <http://www.iandoptics.com/bic/201606301940291864.pdf> (1 page).

Namiki Precision Singapore Pte. Ltd., optical isolators and Faraday rotator product specs, 2019 <http://www.namikisingapore.com.sg/product/fiber_optic/pdf/isolator.pdf> (4 pages).

"Faraday rotator", Wikipedia, May 27, 2020 <https://en.wikipedia.org/wiki/Faraday_rotator> (2 pages).

"Optical isolator", Wikipedia, Apr. 27, 2020 <https://en.wikipedia.org/wiki/Optical_isolator> (4 pages).

Lawrence et al., "A Polarimetric Line-of-Sight Channel Model for MIMO Satellite Communications", 2013 Australian Communications Theory Workshop (AusCTW), IEEE, Adelaide, SA, Australia, pp. 99-104.

Wang et al., "Polarization-independent tunable optical filter with variable bandwidth based on silicon-on-insulator waveguides", Nanophotonics, 2018, 7(8): 1469-1477.

Liaw et al., "Impacts of environmental factors to bi-directional 2x40 GB/s WDM free-space optical communication", Optics Communications, 2017, 396: 127-133.

Non-final Office Action and Notice of References Cited dated Apr. 14, 2021 in U.S. Appl. No. 16/929,436 (25 pages).

Bekkali Abdelmoula et al., "Full-duplex FSO Communication System utilizing Optical Image Stabilizer and Free-Space Optical Circulator", 2020 European Conference on Optical Communications (ECOC), Dec. 1, 2020, pp. 1-3, retrieved from <https://ieeexplore.ieee.org/stampPDF/getPDF.jsp?tp=&arnumber=9333183&ref=aHR0cHM6Ly9pZWVleHBsb3JlLmllZWUub3JnL2RvY3VtZW50LzkzMzMxODM=>.

Wu Liang et al., "Polarization-independent beam-steering system based on liquid-crystal spatial light modulators ," Proc. SPIE 10941, Emerging Liquid Crystal Technologies XIV, 109410F (Mar. 1, 2019); <https://doi.org/10.1117/12.2508207> retrieved from <https://www.researchgate.net/profile/Liang-Wu-8/publication/331459881_Polarization-independent_beam-steering_system_based_on_liquid-crystal_spatial_light_modulators/links/5d7681e7299bf1cb80950a44/Polarization-independent-beam-steering-system>.

* cited by examiner

TUNABLE AND POLARIZATION INSENSITIVE OPTICAL COMMUNICATION SYSTEM

FIELD

The present disclosure relates to free-space optical (FSO) communication systems, and in particular, to a tunable and polarization insensitive optical communication system.

INTRODUCTION

The following is not an admission that anything discussed below is part of the prior art or part of the common general knowledge of a person skilled in the art.

Free-space optical (FSO) communication systems enable communication between various orbiting satellites and ground terminals. The FSO link often spans thousands, or tens of thousands of kilometers. To cover such expansive distances, a communication terminal must generate a powerful transmit optical signal (e.g., laser) through free space such that the signal reaches its intended destination with sufficient intensity to transfer data with low error rates. The same communication terminal may also receive signals from other terminals. In many cases, the received signal is a much weaker signal owing to the large travelled distances. To this end, the large difference in power between the transmitted and received signals can cause problems where the transmitted signals overwhelm the much weaker received signals. For example, backscattering of stronger transmit signals, onto the system receiver, can prevent the receiver from effective reception of weaker signals. To mitigate this problem, communication terminals often provide for extreme optical isolation between the transmit and receive channels.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In one broad aspect, there is provided an optical communication system, comprising: an optical bench coupling an optical transmit pathway and an optical receiving pathway to an external pathway, the optical bench comprising: an optical circulator comprising a first port, a second port and a third port, wherein the first port is coupled to the optical transmit pathway, the second port is coupled to the external pathway, and the third port is coupled to the optical receiver pathway, wherein the optical circulator is polarization insensitive and is configured to: route a transmitted signal from the first port to the second port, irrespective of the polarization state of the transmitted signal; and route a received signal from the second port to the third port, irrespective of the polarization state of the received signal, a tunable component positioned along the optical receiving pathway; and a controller coupled to the tunable component.

In some example cases, the external pathway comprises external optical elements that reflect a portion of the transmit signal back towards the external pathway.

In some example cases, the optical bench provides greater than 30 dB isolation between the receive signal and the back reflected transmit signal, and provides greater than 50 dB isolation between the optical transmit pathway and the optical receiving pathway.

In some example cases, the external optical elements comprise a fine steering mirror, a coarse pointing assembly, and a beam magnification telescope.

In some example cases, the external optical elements comprises a quarter wave plate.

In some example cases, the system further comprises an optical transmitter coupled to the optical transmit pathway, wherein the optical transmitter is configured to transmit a transmit signal at a first wavelength.

In some example cases, the system further comprises an optical receiver coupled to an optical receiving pathway, wherein the optical receiver is configured to receive a receive signal at the wavelength.

In some example cases, the tunable component comprises a tunable optical bandpass filter.

In some example cases, the tunable optical bandpass filter can be tuned across a wavelength band containing a wavelength associated with a received optical signal In some example cases, the controller is configured to vary the center passband wavelength across the wavelength band.

In some example cases, the tunable component comprises a local oscillator.

In some example cases, the local oscillator comprises a tunable laser.

In some example cases, the optical circulator comprises a first walk off block, a second walk off block, and one or more polarization rotating elements and non-reciprocal polarizers positioned between the first and second walk off blocks.

In some example cases, the one or more polarization rotating elements comprise half wave plates.

In some example cases, the one or more non-reciprocal polarizers comprise faraday rotators Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF THE DRAWINGS

The drawings included herewith are for illustrating various examples of systems, methods, and devices of the present specification and are not intended to limit the scope of what is taught in any way. In the drawings.

Figure 1:
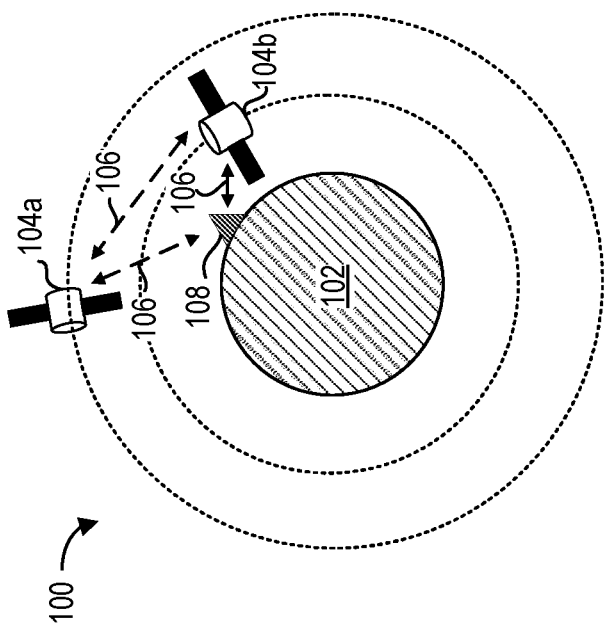
FIG. 1 shows an example environment for a free-space optical (FSO) communication system.

Further aspects and features of the examples described herein will appear from the following description taken together with the accompanying drawings.

DETAILED DESCRIPTION

Various embodiments in accordance with the teachings herein have been described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth in order to provide a thorough understanding of the subject matter described herein. However, it will be understood by those of ordinary skill in the art that the subject matter described herein may be practiced without these specific details. In other instances, well-known methods, procedures and components have not been described in detail so as not to obscure the subject matter described herein. The description is not to be considered as limiting the scope of the subject matter described herein.

It should also be noted that the terms "coupled" or "coupling" as used herein can have several different meanings depending in the context in which these terms are used. For example, the terms coupled or coupling can have a mechanical, fluidic or electrical connotation. For example, as used herein, the terms coupled or coupling can indicate that two elements or devices can be directly connected to one another or connected to one another through one or more intermediate elements or devices via an electrical or magnetic signal, electrical connection, an electrical element or a mechanical element depending on the particular context. Furthermore coupled electrical elements may send and/or receive data.

Unless the context requires otherwise, throughout the specification and claims which follow, the word "comprise" and variations thereof, such as, "comprises" and "comprising" are to be construed in an open, inclusive sense, that is, as "including, but not limited to".

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Reference throughout this specification to "one embodiment", "an embodiment", "at least one embodiment" or "some embodiments" means that one or more particular features, structures, or characteristics may be combined in any suitable manner in one or more embodiments, unless otherwise specified to be not combinable or to be alternative options.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

Similarly, throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), optical pathways (e.g., optical fiber), electromagnetically radiative pathways (e.g., radio waves), or any combination thereof. Exemplary communicative couplings include, but are not limited to, electrical couplings, magnetic couplings, optical couplings, radio couplings, or any combination thereof.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The example systems and methods described herein may be implemented as a combination of hardware or software. In some cases, the examples described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, touchscreen, or the like), and at least one output device (e.g. a display screen, a printer, a wireless radio, or the like) depending on the nature of the device.

Some elements that are used to implement at least part of the systems, methods, and devices described herein may be implemented via software that is written in a high-level procedural language such as object-oriented programming. The program code may be written in C++, C#, JavaScript, Python, or any other suitable programming language and may comprise modules or classes, as is known to those skilled in object-oriented programming. Alternatively, or in addition thereto, some of these elements implemented via software may be written in assembly language, machine language, or firmware as needed. In either case, the language may be a compiled or interpreted language.

At least some of these software programs may be stored on a computer readable medium such as, but not limited to, a ROM, a magnetic disk, an optical disc, a USB key, and the like that is readable by a device having at least one processor, an operating system, and the associated hardware and software that is used to implement the functionality of at least one of the methods described herein. The software program code, when read by the device, configures the device to operate in a new, specific, and predefined manner (e.g., as a specific-purpose computer) in order to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

As explained in the background, free-space optical (FSO) communication systems enable communication between various orbiting satellites and ground terminals, and may often span thousands, or tens of thousands of kilometers.

Reference is made to FIG. 1, which shows an example environment 100 for an FSO communication system.

As shown, FSO systems enable data to be exchanged across air mediums and/or vacuums (e.g., space). For example, FSO communication terminals may be installed on satellites 104a-104b orbiting a ground reference 102 (e.g., earth), and may allow transmission and/or reception of optical signals 106 across vacuums (e.g., space) as between multiple satellites, as well as between satellites 104 and either ground-based terminals 108 (e.g., mobile or stationary) or airborne objects (e.g., an aircraft). FSO links may also be established between various ground-based terminals 110, as well as between ground-based terminals 110 and airborne objects 108.

Figure 2:
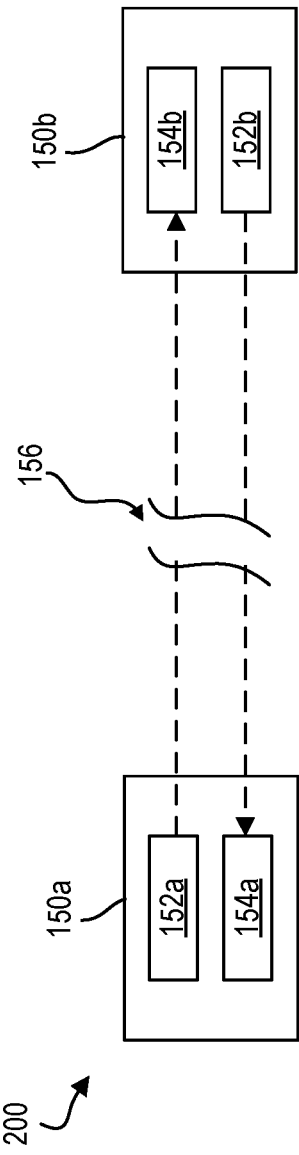
FIG. 2 shows a simplified block diagram of an example free-space optical (FSO) communication link.

FIG. 2 shows a simplified block diagram for an example free space optical (FSO) communication link 200.

As shown, an example optical communication link 200 may include transceivers 150a, 150b. Each transceiver may be located in a separate communication terminal (e.g., satellite, ground-based terminal, etc.). Each transceiver 150a, 150b includes a respective transmitter subsystem 152a, 152b and a respective receiver subsystem 154a, 154b. In this manner, each transceiver 150 may both transmit and receive optical signals over free-space medium 156. Each of the transmitting and receiving subsystem 152, 154 may include a combination of optical mirrors and lenses for directing received and transmitted signals.

While only two transceivers are illustrated in FIG. 2, it will be understood that an FSO communication network can include any number of communicating receivers, transmitters and/or transceivers.

As further noted background, to cover expansive FSO link distances, a powerful transmit optical signal (e.g., laser) is sent through free space (i.e., via the transmitter 152), and received as a much weaker optical signal at a receiving terminal (i.e., via the respective receiver subsystem 154). In many cases, the transmitted signal power is 70 dB to 90 dB greater than the received optical signal. Accordingly, within a given communication terminal, there is a requirement to prevent the more powerful transmitted signal from overwhelming concurrently received optical signals, and particularly, to otherwise avoid backscattering of the transmitted signal onto the system receiver. This is often addressed by providing extreme optical isolation between the transmitted and received optical beams.

Existing solutions achieve optical isolation between the transmit and receive channels through various schemes that include spatial optical separation, as well as polarization and wavelength multiplexing schemes.

Spatial separation achieves optical isolation through the use of different optical components for the transmit and receive channels. Spatial separation techniques, however, may be expensive as they require double the optical components (i.e., double the cost) for each channel.

Alternatively, polarization and wavelength multiplexing schemes achieve isolation through the use of different optical polarization states (e.g., orthogonal polarization states), or different wavelengths, for the transmit and receive channels. In this manner, the transmit and receive signals may share the same optical elements, and the optical elements may be selected to separately re-direct the transmit and receive signals based on their incident polarization or wavelength.

Still, existing solutions based on polarization or wavelength multiplexing suffer from important drawbacks. For example, optical elements used in these systems often only accommodate for one type of multiplexing scheme. In turn, these systems are not dynamically adaptable to accommodate for both types of multiplexing, and may therefore only communicate with other terminals configured for the same type of multiplexing scheme.

Here, it is recognized that there is a significant benefit to an optical communication terminal capable of communicating using any polarization or wavelength multiplexing scheme (i.e., a "universal" optical terminal). Such an optical terminal would dynamically adapt to communicate with various other types of terminals, irrespective of the polarization or wavelength multiplexing scheme used by that terminal.

In view of the foregoing, the present disclosure provides for an FSO communication terminal that is adaptable to receive or transmit using any polarization state, any wavelength and using any acquisition and tracking processes (e.g., beacon-based or beacon-less).

Figure 3A:
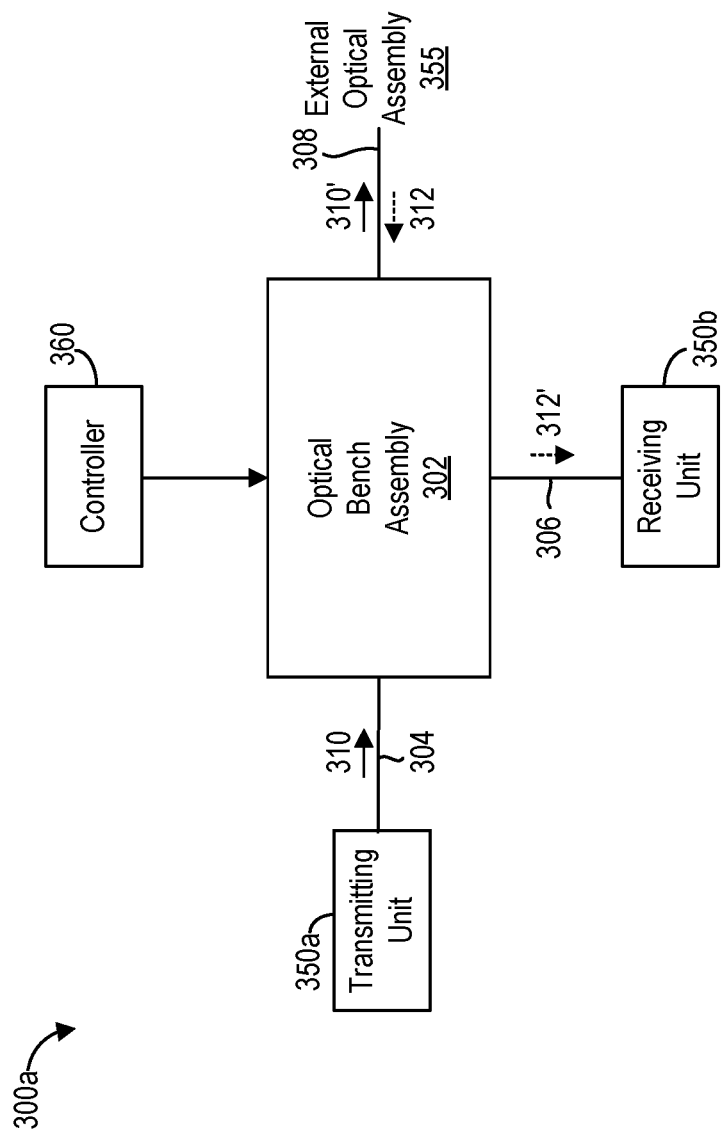
FIG. 3A shows a high-level block diagram for an example optical communication system.

Reference is now made to FIG. 3A, which shows a high-level block diagram for an optical communication system 300a.

As shown, the system 300a includes an optical bench assembly 302. As explained, optical bench assembly 302 allows for transmitting and receiving signals having various polarization states, and is further tunable to accommodate for various wavelengths for the transmitted and received signals, and using any acquisition and tracking process.

In more detail, optical assembly 302 is interposed between a transmit signal pathway 304, a receive signal pathway 306 and an external pathway 308. As described herein, the optical assembly 302 is able to provide high optical isolation between the transmit and receive signal pathways 304, 306. In at least some example cases, the optical assembly 302 provides greater than 30 dB isolation between the received signal and back reflected transmitted signals, and provides greater than 50 dB isolation between the optical transmit pathway and the optical receiving pathway.

Transmit pathway 304 is connected to transmitting electronics 350a (e.g., electronics generating and modulating a transmitted optical signals 310). Irrespective of the wavelength or linear polarization state of the transmitted signal 310—optical assembly 302 may be dynamically configured to internally route these signals to the external pathway 308. External pathway 308 may, in turn, couple to an external optical assembly 355 (not shown), which is used to transmit the signal 308, i.e., through free space.

In at least some example cases, optical bench assembly 302 may receive an input transmitted signal 310 that is linearly polarized along any desired axis (e.g., s-polarized, p-polarized or multiplexed s- and p-polarized). The optical assembly 302 may then convert this signal into a corresponding circularly polarized output signal 310' adapted for transmission over elongated distances (e.g., left hand circularly polarized (LHCP), right hand circularly polarized (RHCP) or a polarization multiplexed LHCP/RHCP).

Optical assembly 302 may also receive signals 312 via the external pathway 308. As explained, irrespective of the wavelength or polarization state of the received signal 312 (i.e., circularly polarized or unpolarized)—the assembly 302 may again internally route the received signals 312 to the receiving pathway 306, and away from the transmitting pathway 304. The receiving pathway 306 may couple to various receiving electronics 350b which receive and process the signal 312.

In at least some example cases, the optical assembly 302 may receive an input received signal 312 that is either circularly polarized (e.g., LHCP, RHCP, or a polarization multiplexed LHCP/RHCP), or otherwise unpolarized. The optical assembly 302 may then generate a linearly polarized output signal 312', which is passed to the receiving pathway 306.

While not shown, optical assembly 302 may also route received signals 312' to a pointing, acquisition and tracking (PAT) system. The system can acquire and track the signal by relying either on a beacon at either the communication wavelength or another wavelength, or on a beaconless acquisition and tracking strategy As further provided, to enable transmission and reception of optical signals at any wavelength, the assembly 302 may also include various tunable components. These include, for example, tunable optical filters configured for different wavelength passbands, tunable fiber Bragg gratings (FBGs), or tunable thin film interference filters. In other cases, the tunable components may comprise local oscillators used for implementing heterodyne reception protocols. In at least one case, the assembly 302 may be coupled to a controller 360, which can automatically configure and/or re-configure properties of the tunable components.

Figure 3B:
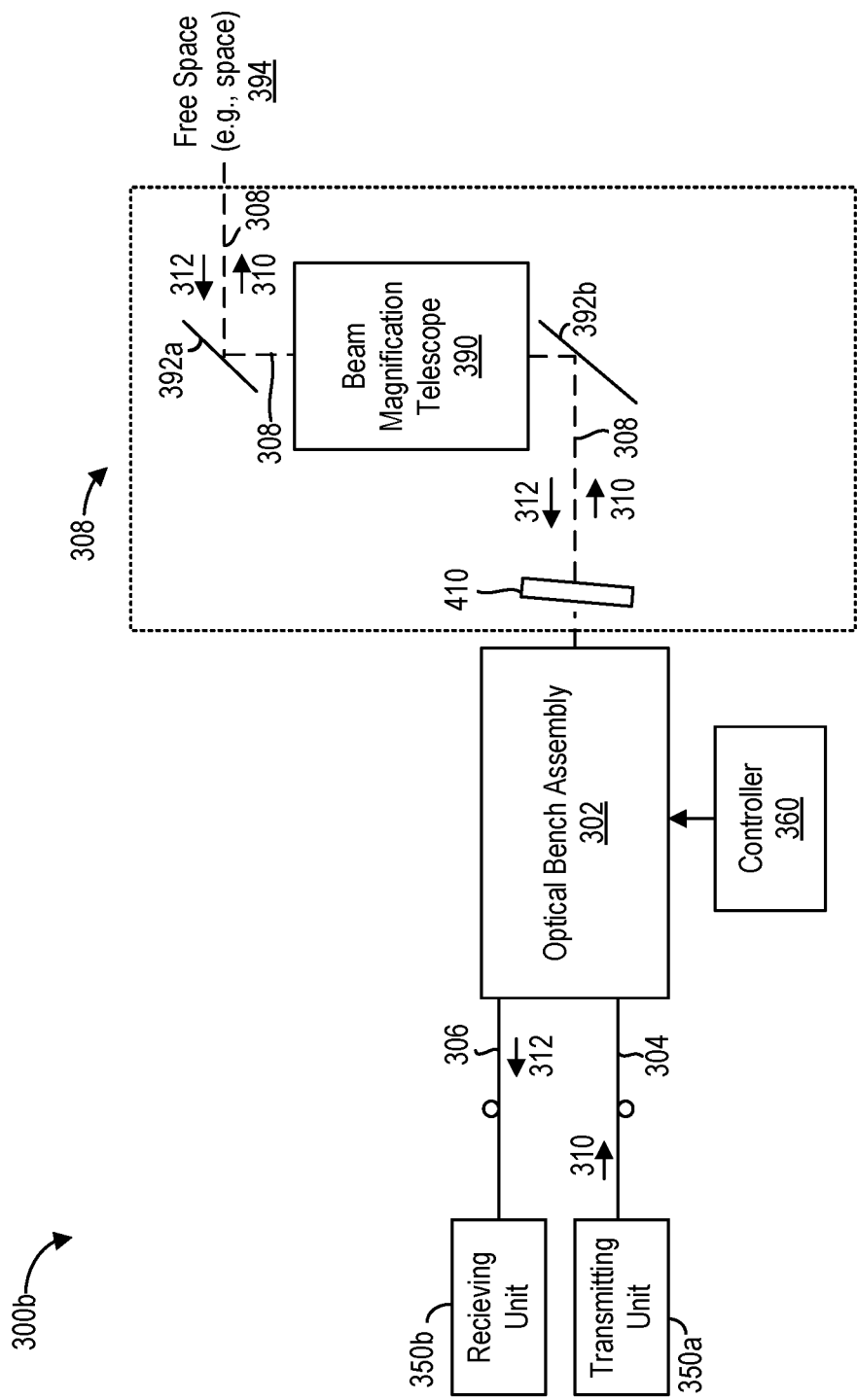
FIG. 3B shows an example FSO communication terminal, which includes an example external optical assembly.

Reference is now made to FIG. 3B, which shows an example FSO communication terminal 300b, which includes various other example components of the external signal pathway 308. The terminal 300b is an example terminal design in which the optical assembly 302 may installed in.

As shown, optical bench 302 is again interposed between the transmitting signal pathway 304, receiving signal pathway 306 and external signal pathway 308.

External signal pathway 308 may include a series of optical components, including a beam magnification telescope 390. Telescope 390 can include an optical train used to magnify or de-magnify transmitted/received optical signals, so that the signals can propagate over longer distances in free space with the least amount of divergence. Telescope 390 may preferably comprise various mirrors to ensure achromatic performance.

A coarse pointing assembly (CPA) 392a may also, in some example cases, be positioned along the external signal pathway 308. For example, the CPA 392a may be positioned after the telescope 390 and before signals are emitted or received from fee space 394. CPA 392a may be used for coarse pointing of optical signals. A fast steering mirror (FSM) 392b may also be further positioned, along external signal pathway 308. For example, FSM 329b may be positioned between the optical bench assembly 302 and the telescope 390. FSM 392b can be used to correct for higher frequency mechanical jitter.

As described herein, the external signal pathway 308 (i.e. comprising all optical components), may be designed to be transparent to optical signals with any wavelength and any polarization.

It will be appreciated that various other designs and configurations for the external signal pathway 380 may also be provided.

In at least some example cases, the transmit and receiving pathways 304, 306 may comprise fiber optic cables. For example, the transmit pathway 304 may comprise polarization maintaining fibers (PMFs), which carry any linear polarization of input transmitted signals to the polarization insensitive optical bench assembly 302 (e.g., linear s- or p-polarization along any of the PMF's principle axis, or s/p muxed input signals). In this manner, the optical bench assembly 302 may receive any desired input linear polarization of optical signals. In some cases, the receiving pathway 306 may comprise a single mode fiber for receiving linearly polarized or unpolarized signals.

Figure 4A:
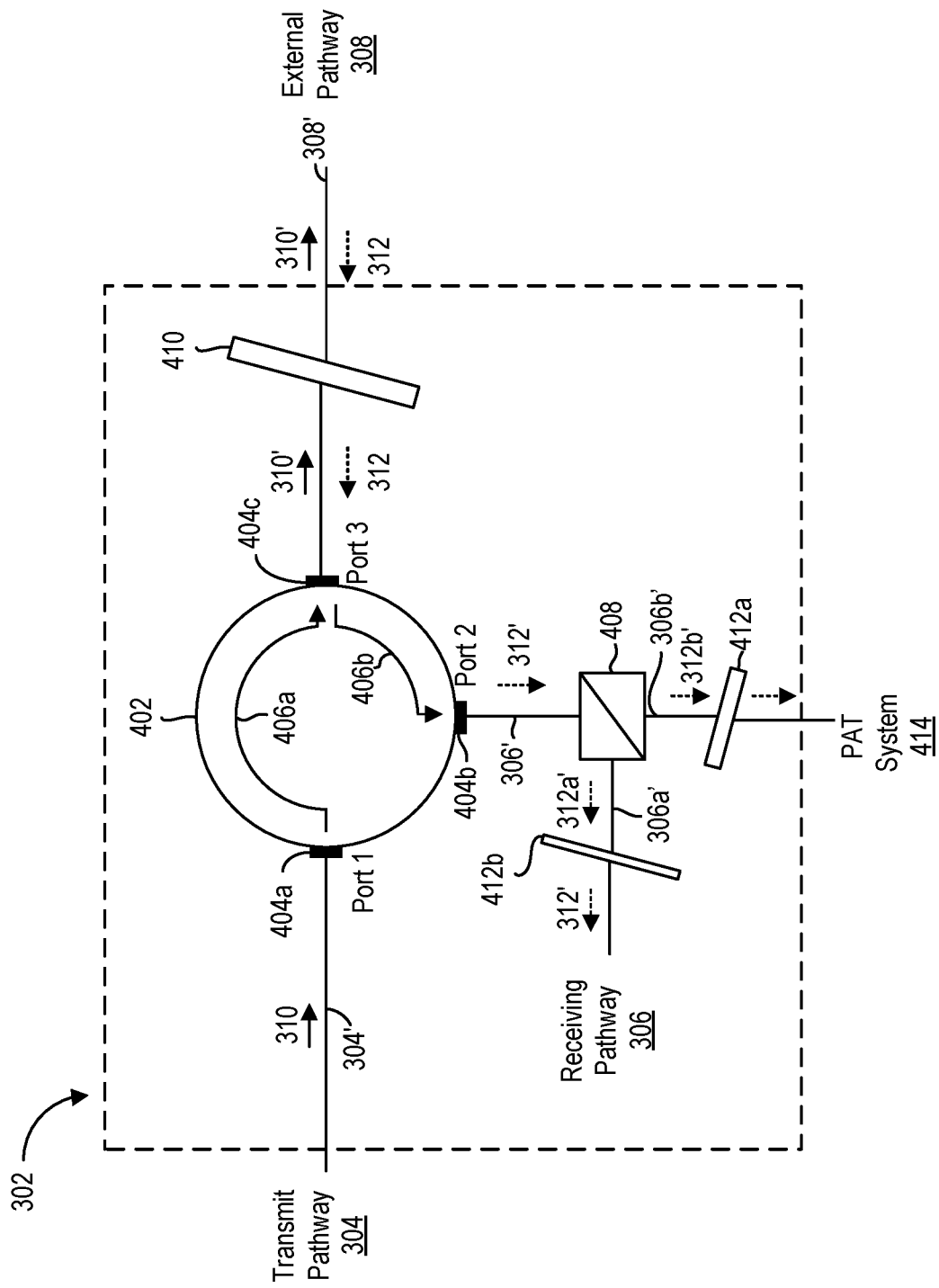
FIG. 4A shows a simplified block diagram of the example optical bench assembly.

Reference is now made to FIG. 4A, which shows a simplified block diagram of the optical bench assembly 302.

As shown, optical assembly 302 may include an optical circulator 402 which couples between an internal portion of the transmit pathway 304', an internal portion of the receiving pathway 306' and an internal portion of the external pathway 308' (i.e., internal to the assembly 302)

The optical circulator 402 may include a first port 404a coupled to the transmit pathway 304', a second port 404b coupled to the receiving pathway 306' and a third port 404c couple to the external signal pathway 308'.

In operation, the optical circulator 402 internally directs optical signals from port one '1' 404a to port three '3' 404c. In this manner, the transmitted signals 310 are routed along internal path 406a from the transmit signal pathway 304 to the external signal pathway 308. Further, optical circulator 402 internally directs optical signals received at port three '3' to port two '2' along internal pathway 406b. As such, received signals 306 from external pathway 308' are directed internally towards the receiving pathway 306'.

As such, the optical circulator 402 primarily functions to independently route, and otherwise optically isolate and separate the transmitted and received signals 310, 312. In at least some cases, the optical circulator 402, in conjunction with tunable components (e.g., tunable filters) on the receiving path, is configured to provide greater than 50 dB, 60 dB, 70 dB and/or 80 dB of optical isolation between the transmit and receiving pathways.

As explained previously, the optical circulator 402 is also polarization insensitive. Accordingly, the optical circulator 402 is compatible with various input polarization states for the transmitted signals 310 (e.g., signals received from transmit pathway 304 which are s-, p- or muxed s/p linear polarized). The optical circulator 402 is also adapted to receive various polarized or unpolarized signals from external pathway 308' (e.g., LHCP, RHCP, LHCP/RHCP muxed, s-, p- or s/p linearly polarized). In this manner, the optical circulator 402 enables the communication terminal to communicate with other terminals using any desired polarization state.

Optical bench assembly 302 also includes tunable components 412a, 412b (e.g., tunable filters) which can accommodate for different wavelengths of transmitted and received optical signals. As explained, the tunable components may be positioned ahead of the receiving pathway 306 and PAT system 414. In some cases, the tunable components may also be integrated into the optical circulator 402.

The tunable components 412 may be configured to have a wavelength passband range that is tuned to the receiving wavelength, but that excludes the transmit wavelength. In this manner, the tunable components filter out backscattered transmitted signals that are routed from port '3' 404c, to port '2' 404b, and that are outside of the acceptable passband of receiving wavelengths. In this manner, the tunable components enhance the optical isolation between the transmit and receive channels.

The optical assembly 302 may also include a beam splitter 408. Beam splitter 408 is positioned along the internal receiving pathway 306', and bisects a portion of the internal pathway 306a' feeding into the receiving pathway 306, and a portion feeding to the PAT system 414 (i.e., for fine pointing tracking control).

To this end, beam splitter 408 can split some of the received signal 312b' towards the PAT system 414, while directing the remaining portion of the received signal 312a' toward the receiving pathway 306. In some example cases, the beam splitter 408 is 90:10 splitter, such that 10% of the signal is directed towards the position sensor in the system 414, and the remaining 90% is directed toward the receiving pathway 306.

A quarter wave plate (QWP) 410 is located along the internal portion 308' of the external signal pathway. As explained, the QWP 410 is used to convert between circularly and linearly polarized signals.

While the QWP 410 is illustrated as being located inside the optical bench assembly 302, QWP 410 may also be disposed anywhere along the external signal pathway 308, i.e., anywhere between the optical bench 302 and free-space (e.g., before or after the external optical assembly 390). For example, in FIG. 3B, the QWP 410 is shown as being located outside the optical bench 302. Alternatively, the QWP 410 may be located anywhere along the external signal pathway between the optical bench 302 and free space 394.

Figure 4B:
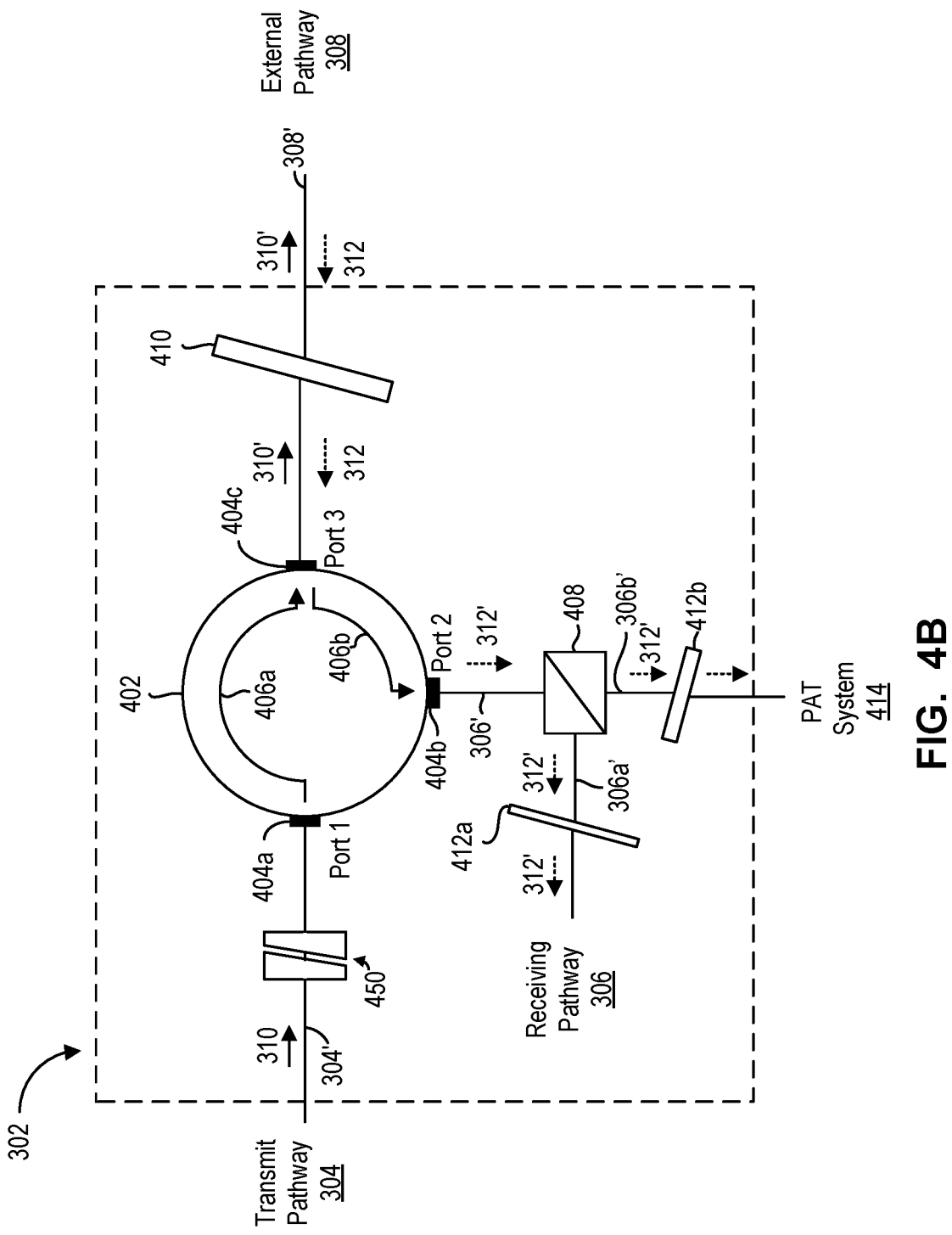
FIG. 4B shows a simplified block diagram of another example optical bench assembly.

Reference is now made to FIG. 4B, which shows a simplified block diagram of the optical bench assembly 302.

Optical assembly 302 of FIG. 4B is analogous to the optical assembly of FIG. 4A, with the exception that the internal receiving pathway 304' further includes a fine pointing assembly 450 which can be used to steer the transmitted beam 310 over a narrow cone of angle to account for Point Ahead requirements (e.g., a few tens of microradians). In the illustrated example, the fine pointing assembly 450 comprises a Risley prism pair 450. In other example cases, the fine pointing assembly 450 can comprise a fast steering mirror. While not shown, the fine pointing assembly 450 may be controllable by a driver to achieve different transmission steering configurations. The driver may, itself, be coupled to, and controlled by, the controller 360 (FIGS. 3A and 3B)

Figure 5A:
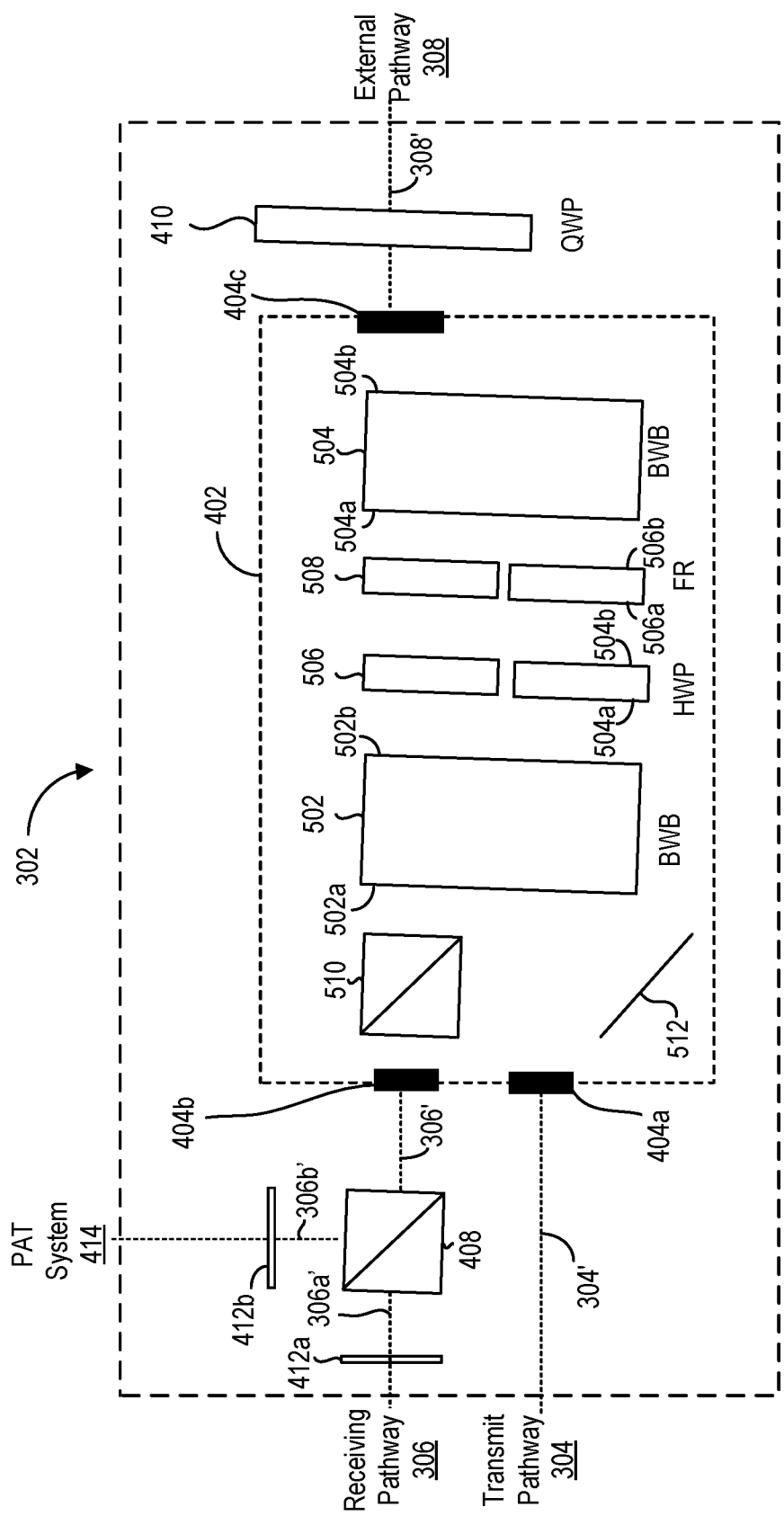
FIG. 5A shows an example configuration for the optical circulator in an optical bench assembly.

Reference is now made to FIG. 5A, which illustrates an example configuration for the optical circulator 402 in the optical bench assembly 302.

As shown, the optical circulator 402 may include one or more birefringent walk-off blocks (BWB) 502, 504, located on either side of polarization rotating elements 506a, 506b and non-reciprocal polarizers 508a, 508b (e.g., a faraday rotor (FR)). In the exemplified case, the polarization rotating elements 506a, 506b are half wave plates (HWPs), but in other cases they may be, for example, a liquid crystal retardance element. Further, the non-reciprocal polarizers 508 may be faraday rotators (FR).

Each of the walk-off blocks and polarizers may include opposed first lateral surfaces 502a, 504a, 506a, 508a and second lateral surfaces 502b, 504b, 506b and 508a from which optical signals may enter or exit. The optical circulator 402 may also include a polarization beam splitter 510 and a folding element such as a reflection mirror or right-angle prism 512.

Figure 5B:
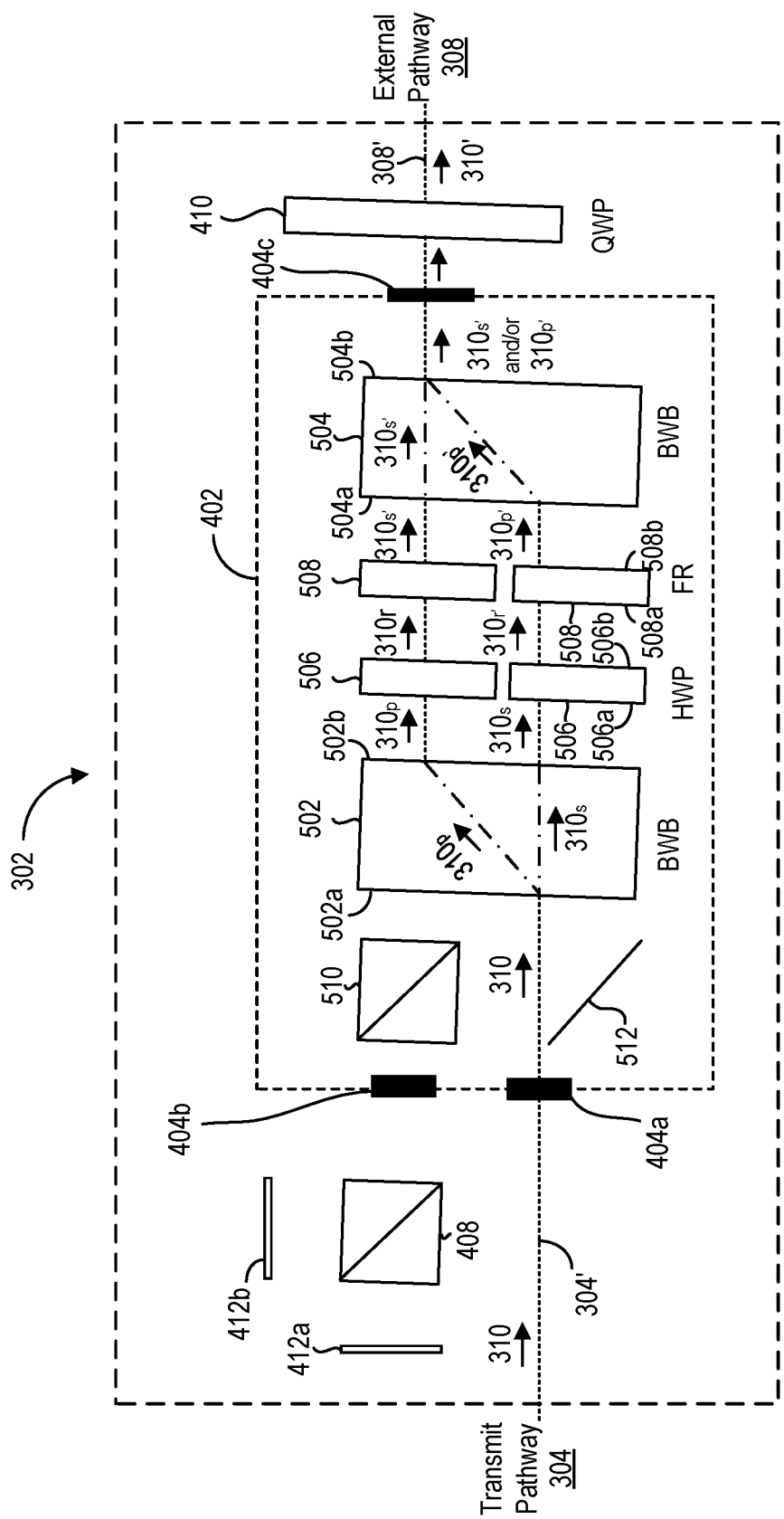
FIG. 5B shows the optical bench assembly of FIG. 5A in a case where optical signals are being transmitted.

Reference is now made to FIG. 5B, which illustrates the function of the optical circulator 402 where an optical signal 310 is being transmitted.

As shown, the transmitted optical signal 310 may be received from the transmitting unit 350a. The signal 310 may be a linearly polarized signal, and may be an s-polarized, p-polarized or a multiplexed s/p polarized. Signal 310 may be carried to the optical circulator 402 by a polarization maintaining fiber (PMF), as discussed previously.

Transmitted signal 310 enters the optical circulator 402 through the first port 404a, and is incident on a first surface 502a of the walk-off block 502. Walk-off block 502 splits the incident signal 310 into different directions based on the polarization state of the signal. For example, s-polarized signals $310_s$ may pass directly through the block 502. In contrast, p-polarized signal $310_p$ may be reflected at a 45° angle. Accordingly, p- and s-polarized signals $310_s$ and $310_p$ may exit the second block surface 502b at different spatial positions at the block's second surface 502b. Where the incident signal 310 is a combination of s- and p-polarizations (e.g., s/p muxed), then the different polarization components are split by the walk-off block 502 as shown. The split signals then continue through optical circulator 402 in parallel fashion.

As shown, after the walk-off block 502, the linearly polarized signals $310_s$ and/or $310_p$ continue onwards to the respective half wave plates 506a, 506b, which are positioned along the respective signal paths. Each of the polarized signals $310_p$ and/or $310_s$ separately enters a respective HWP 506 from a first surface 506a, and exits from the respective opposed surface 506b. HWPs 506 operate to rotate the linear polarization of each of the incident signals by 45 degrees, creating a "mixed" state that is a combination of both s- and p-polarizations, as is known in the art.

The intermediate rotated, linearly polarized signals $310_r$ and/or $310_{r'}$ (i.e., r- and r'-polarized signals, respectively) then pass through respective non-reciprocal polarizers 508, i.e., the faraday rotators 508. Each faraday rotator 508 rotates each signal. When travelling through the faraday rotators 508 in the transmission direction, the faraday rotator 508 rotates each signal by a further 45° counter clockwise (or clockwise depending on the orientation of the magnetic field) such as to generate linearly polarized signal $310_{s'}$ from the r-polarized signal $310_r$, and linearly polarized signal $310_{p'}$ from the r'-polarized signal 310.

Each of the linear signals $310_{s'}$ and/or $310_{p'}$ then passes through a second walk-off block 504. The s-polarized signal $310_{s'}$ is simply passed through the block 504, while the p-polarized signal $310_{p'}$ is internally reflected by 45°. In either cases, the polarized signals $310_{s'}$ and/or $310_{p'}$ are internally routed towards the third port 404c of the optical circulator 402. In a case where both signals $310_{s'}$, $310_{p'}$ pass concurrently through the block 504, then a combined (or multiplexed) signal is generated, which includes both orthogonal components $310_{s'}$, $310_{p'}$.

Signals $310_{s'}$ and/or $310_{p'}$ may then exit the third optical circulator port 404c, and may continue onwards to the quarter wave plate (QWP) 410. As is known in the art, the QWP 410 converts the rotated, linearly polarized signals into output circularly polarized signals 310'. For example, this may involve converting the signals $310_{s'}$ or $310_{p'}$ into right hand circularly polarized (RHCP) signals 310' or left hand circularly polarized (LHCP) signals 310', as the case may be. In cases where both signals $310_{s'}$ and $310_{p'}$ pass through the QWP 410 concurrently, then the QWP 410 may generate a combined (or multiplexed) LHCP/RHCP output signal 310'.

It will now be appreciated that the optical circulator 402 is polarization insensitive in that it can accommodate any desired linear polarization of the input transmitted signal 310. That is, it can accommodate input transmitted signals 310 which are either 's'-linearly polarized, 'p'-linearly polarized, or combined 's'- and 'p'-linearly polarized. In any of these cases, optical circulator 402 will direct the signal towards the external pathway 308, and away from the either the transmit pathway 304 or receiving pathway 306. The optical circulator 402 passes these signals to the QWP 410, such as to transmit any desired circularly polarized signal 310', e.g., LHP, RHCP or combined LHCP/RHCP polarized. In this manner, optical bench assembly 302 enables communication system to use any desired circular polarization mode to communicate with any other terminal, irrespective of the configuration of that other terminal.

Figure 5C:
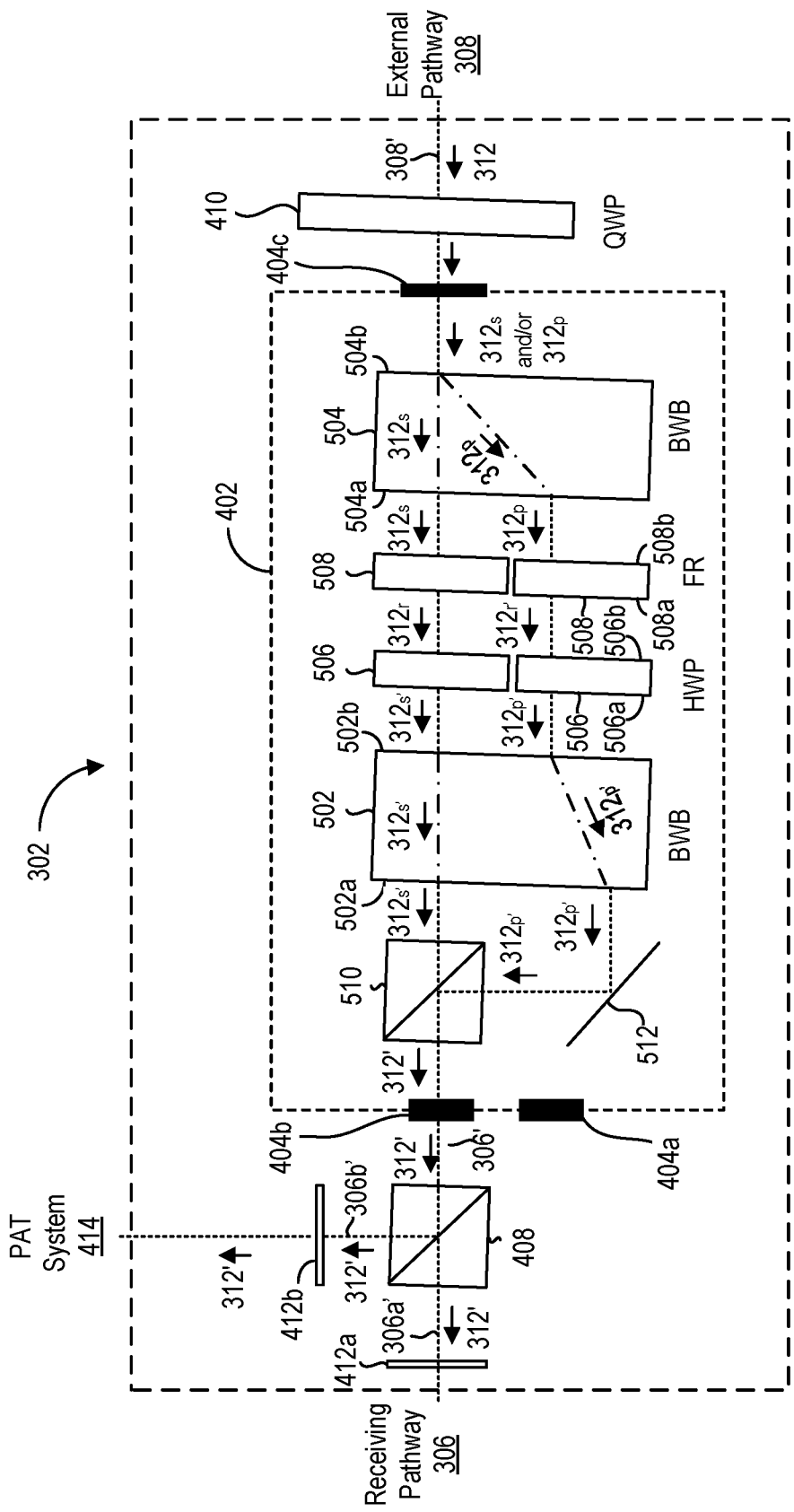
FIG. 5C shows the optical bench assembly of FIG. 5A in a case where optical signals are being received.

Reference is now made to FIG. 5C, which illustrates the function the optical circulator 402 where an optical signal 312 is being received.

As shown, signal 312 may be received which may be either LHCP, RHCP or combined LHCP/RHCP polarized. In other cases, the signal may also be an unpolarized signal.

Circularly polarized signals 312 passthrough the quarter wave plate (QWP) 410, and exit as linearly polarized signal $312_s$ or $312_p$ (i.e., based on the direction of circular polarization). Otherwise, if the signals 312 include multiplexed LHCP and RHCP, then the signals exiting the QWP 410 include both linearly polarized signal portions $312_s$ or $312_p$. Where the signals 312 are unpolarized (e.g., an indeterminate combination of linear or circular polarization states), they may simply pass through the QWP 410 and remain an indeterminate combination of states at the input of the optical circulator 402.

In the case of a received circularly polarized beams 312, the linearly polarized signals $312_s$ and/or $312_p$— exiting the QWP 410— enter the optical circulator 402 from the third port 404c, and pass through the walk-off block 504. Walk-off block 504 may pass the linearly rotated signal $312_s$ directly though, and may refract the linearly rotated signal $312_p$ by 45° such as to exit from a different portion of the block 504.

In the case of a received non-polarized signal 312, the walk-off block 504 may still separate the linearly polarized components $312_s$ and/or $312_p$ from the unpolarized signal into their constituent paths.

From the walk-off block 504, each signal $312_s$ and/or $312_p$ is passed through the non-reciprocal polarizer 508. In this example, the faraday rotator may apply a further +45° counter clockwise rotation to the incident signals such that the linearly polarized signals $312_s$ and/or $312_p$ are converted into intermediate r- and r'-polarized signals $312_r$ and $312_{r'}$, respectively (e.g., an intermediate rotated linearly polarized signals). This linear polarization is then de-rotated by the HWP 506 to reconstitute signals $312_{s'}$ and $312_{p'}$, respectively.

Walk-off block 502 receives the signals $312_{s'}$ and $312_{p'}$. In this example case, the walk-off block 502 may directly pass through the signal $312_{s'}$, but may otherwise internally deflect the signal $312_{p'}$ by 45°. This ensures that the signal $312_{s'}$ is offset from the position of the location of the first port 404a of the optical circulator 402.

Signal $312_{s'}$ may pass directly to the polarization beam splitter 510. The signal $312_p$ may be reflected to the polarization beam splitter 510 via reflector 512 (e.g., a prism reflector).

Polarization beam splitter 510 can direct the signals out of the second port 404b of the optical circulator 402. If only the signal $312_{s'}$ is passing through the optical circulator 402, then beam splitter 510 simply passes the signal $312_{s'}$ out of the second port 404b. Accordingly, the output signal 312' only comprises the linearly s-polarized signal $312_{s'}$. Otherwise, if only the signal $312_{p'}$ is travelling through the optical circulator 402, then beam splitter 510 may internally reflect the signal $312_{p'}$ out of the second port 404b. In this cases, the output signal 312' only comprises the linearly p-polarized signal $312_{s'}$. Still further, if both signals $312_{s'}$ and $312_{p'}$ are travelling through the optical circulator 402, then beam splitter 510 may combine the signals together such that output signal 312' comprises a multiplexed "p" and "s" polarized signal.

In view of the foregoing, it is now further appreciated that, in the receiving direction, the optical circulator 402 is also able to accommodate for any desired polarization of the received signal (i.e., LHCP, RHCP or LHCP/RHCP multiplexed), as well as non-polarized signals. That is, in all cases, the optical circulator 402 is able to route these signals towards the second port 404b (i.e., coupled to the internal receiving path 306'), and away from the first port 404 (i.e., coupled to the transmission pathway 304). As such, the optical bench assembly 302 enables the communication system to communicate with any other terminal, irrespective of the polarization transmission configuration of that other terminal.

As shown, output signal 312' can be further passed through the beam splitter 408 (e.g., a 90:10 beam splitter). Beam splitter 408 passes some of the signal towards the receiving pathway 306 and some of the signal towards the PAT system 414.

As noted previously, tunable optical bandpass filters 412a, 412b (e.g., thin film interference filters) may be positioned along each signal path 306a' and 306b'. The tunable bandpass filters, which may controlled by controller 360, are configured with an adjustable wavelength bandpass range. In this manner, the tunable filters can be used to ensure that only signals received within a given bandpass wavelength range are passed to the receiving unit 350b and/or the PAT system 414. The bandpass range, of the tunable bandpass filters 412a, 412b, may be adjusted based on the known reception wavelength of the transmitting station, or a desired PAT signal wavelength.

Importantly, the tunable filters 412a, 412b prevent backscattered transmitted signals from overwhelming the receiving pathway 306 (or PAT system 414). For example, where the transmitted signal is at a different wavelength than the received signal, the transmitted signal will not be within the wavelength passband range of the tunable filters 412a, 412b. Accordingly, the tunable filters 412 will filter out the backscattered transmitted signal. Accordingly, the tunable filters 412a, 412b ensure enhanced optical isolation between the receiving channel and the backscattered transmitted signal. In turn, this ensures that the optical bench has an optical isolation of greater than 80 dB between the transmit and receive channels.

Reference is now made to FIGS. 6-9, which show various other example configurations of polarization insensitive optical circulators and optical bench assemblies.

Figure 6:
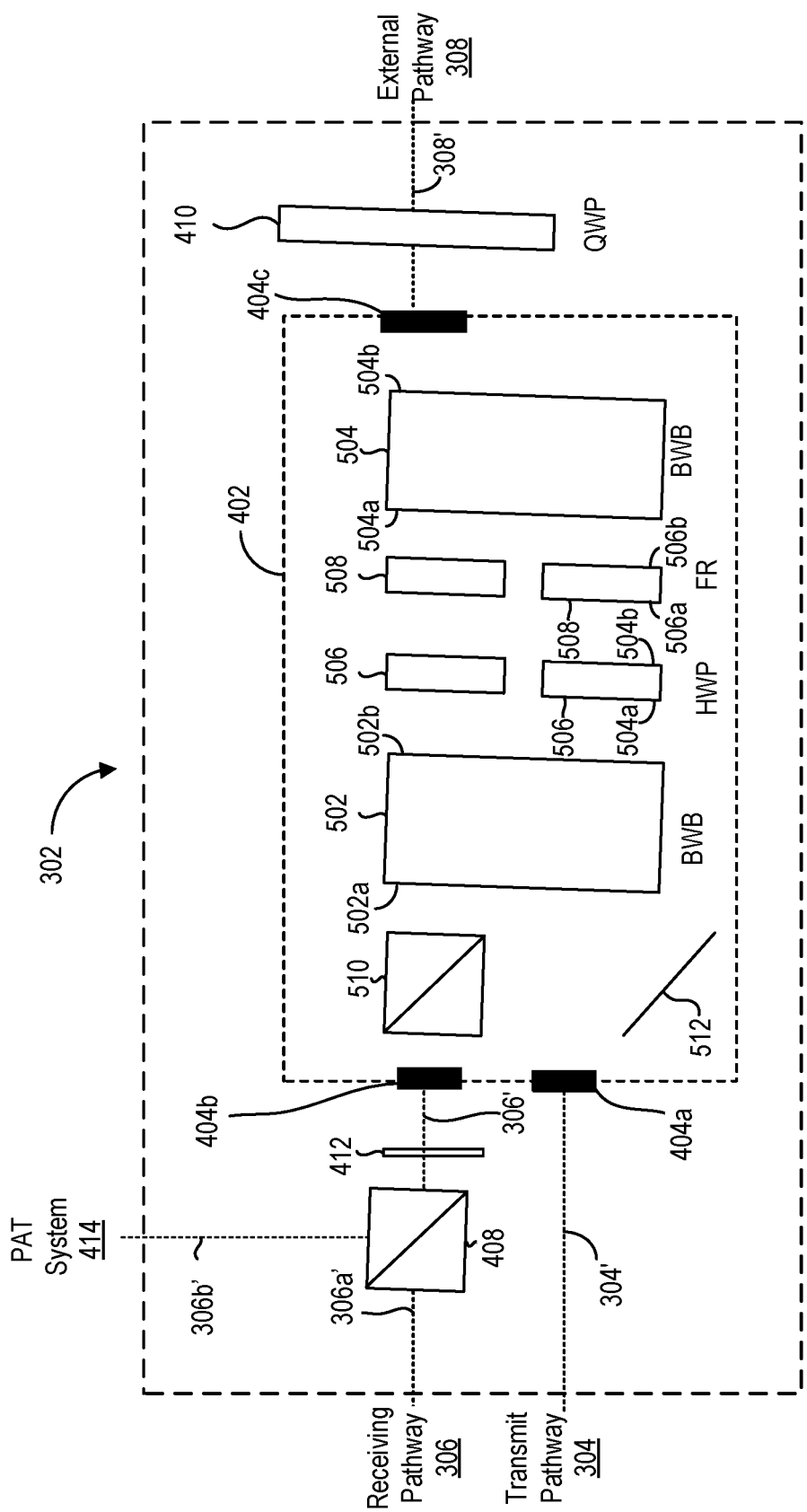
FIG. 6 shows an example optical bench assembly comprising a polarization insensitive optical circulator.

FIG. 6 shows an optical bench assembly which is analogous to that of FIGS. 5A-5C, with the exception that only a single tunable filter 412 is provided for both the receiving pathway 306 and the PAT system 414. The tunable filter 412 is positioned along internal path 306', and ahead of beam splitter 408.

Figure 7:
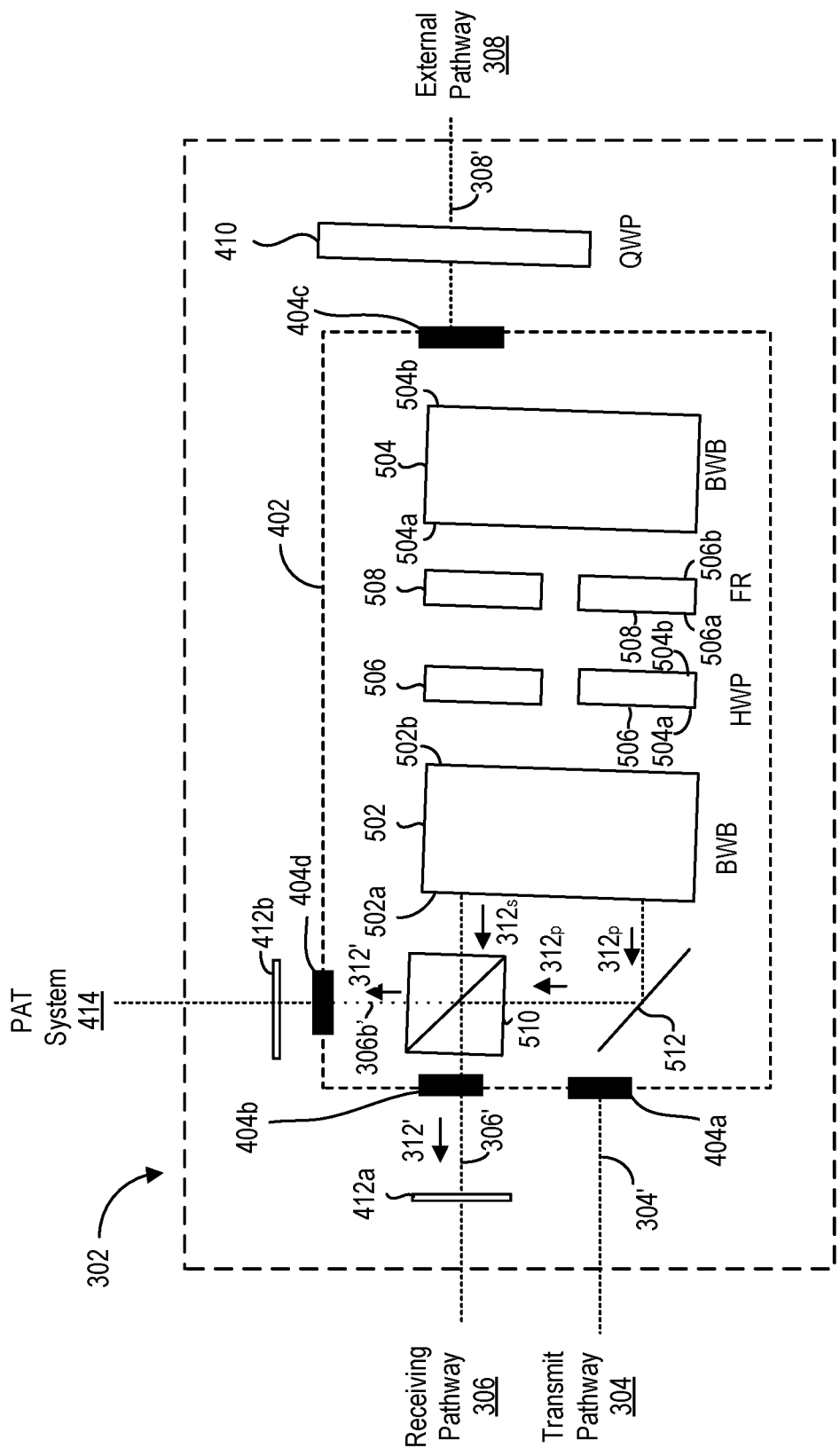
FIG. 7 shows another example optical bench assembly comprising a polarization insensitive optical circulator.

FIG. 7 illustrates a design in which the beam splitter 408 has been removed. Here, the polarization beam splitter 510—inside the optical circulator 402—is configured with a small leak (e.g., 1% leak), such that a small portion of the incident signals $312_s$ and/or $312_p$ is always directly passed, or otherwise internally deflected, to the PAT system 414. In this case, the optical circulator 402 may have a separate, fourth port 404d accommodating the PAT system 414.

Figure 8:
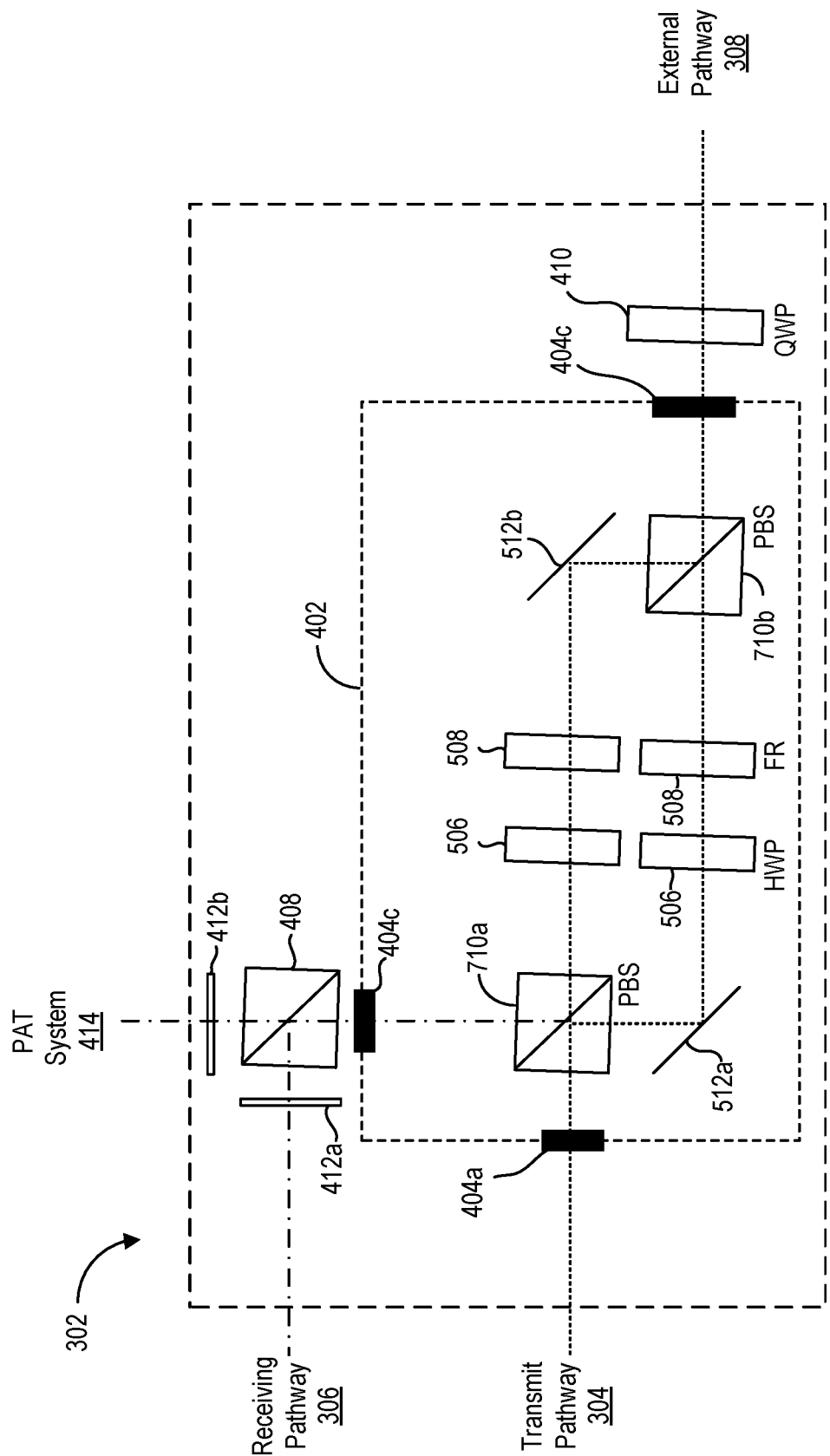
FIG. 8 shows still another example optical bench assembly comprising a polarization insensitive optical circulator.

FIG. 8 illustrates a design fora polarization insensitive optical circulator 402 which uses polarization beam splitters (PBS) 710a, 710b rather than walk-off blocks 502, 504. The PBSs 710a, 710b behave similar to the walk-off blocks, and also function to separate orthogonal linear polarizations into different signal path directions inside the circulator 402. The circulator 402 may also include two sets of reflectors 512a, 512b associated with each PBS 710a, 710b, respectively.

FIGS. 9A-9D illustrate yet further examples for the polarization insensitive optical circulator 402 comprising three consecutive walk-off blocks. In these figures, line-types 908a and 908b express signals of orthogonal linear polarization. Line type 908c expresses signals that can be either type of linear polarization, or a combination of different linear polarizations (including unpolarized). Line type 908d expresses signals that may be either LHCP, RHCP or multiplexed LHCP/RHCP (or unpolarized). The arrow directions correspond to transmit and receive pathways.

Figure 9A:
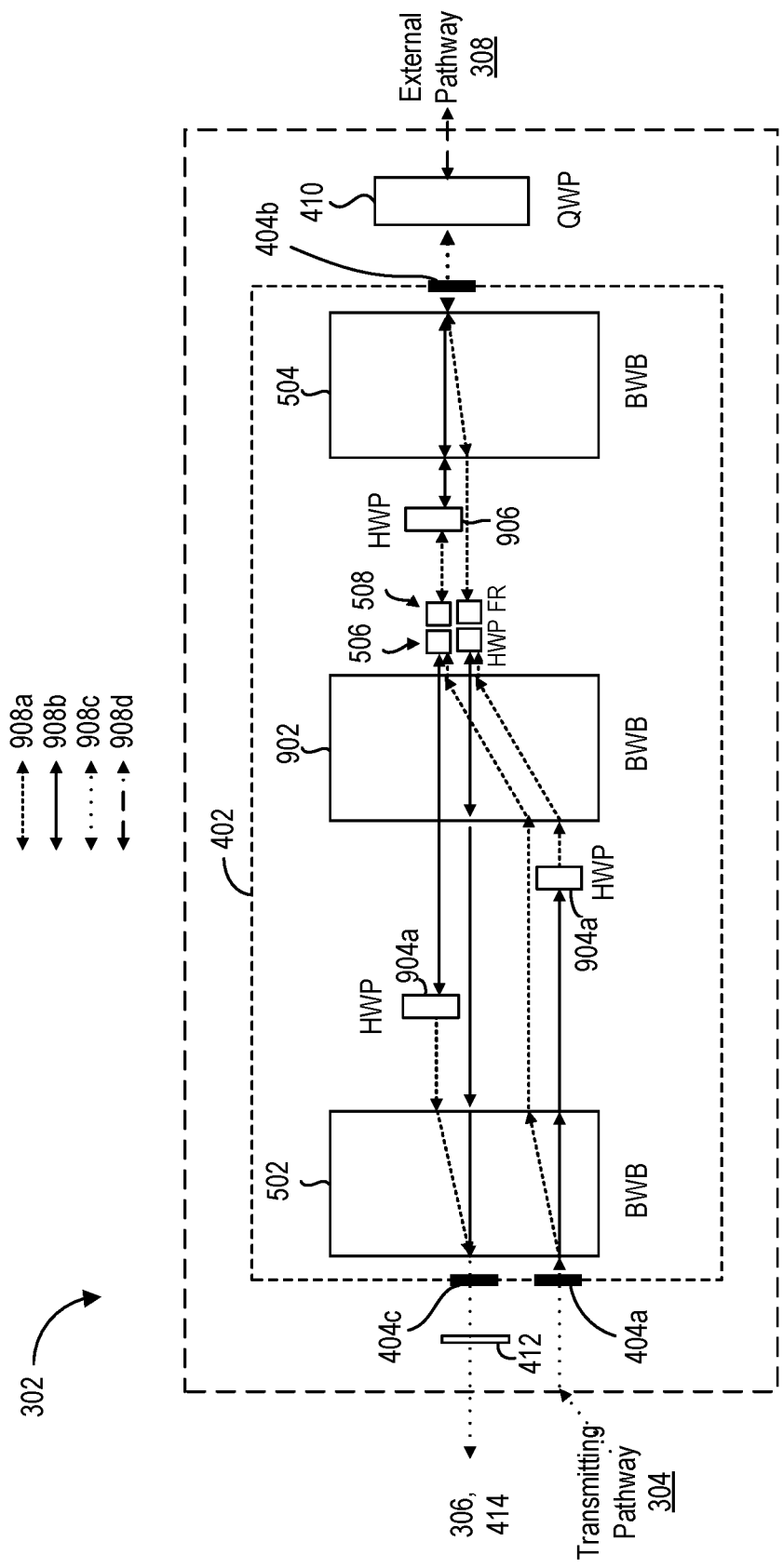
FIG. 9A shows an example optical bench assembly comprising a polarization insensitive optical circulator.

To this end, FIG. 9A illustrates an example optical circulator 402 using three walk-off blocks 502, 902 and 504. The central walk-off block 904 is positioned perpendicularly to the walk-off blocks 502, 504. The configuration between walk-off blocks 902 and 504 is analogous to that of FIG. 5 (i.e., as between walk-off blocks 502 and 504), with the addition of a HWP 906 along one of the signal paths. In FIG. 9A, two HWPs 904a, 904b are additionally positioned along different signal paths, between walk-off blocks 502 and 902.

Figure 9B:
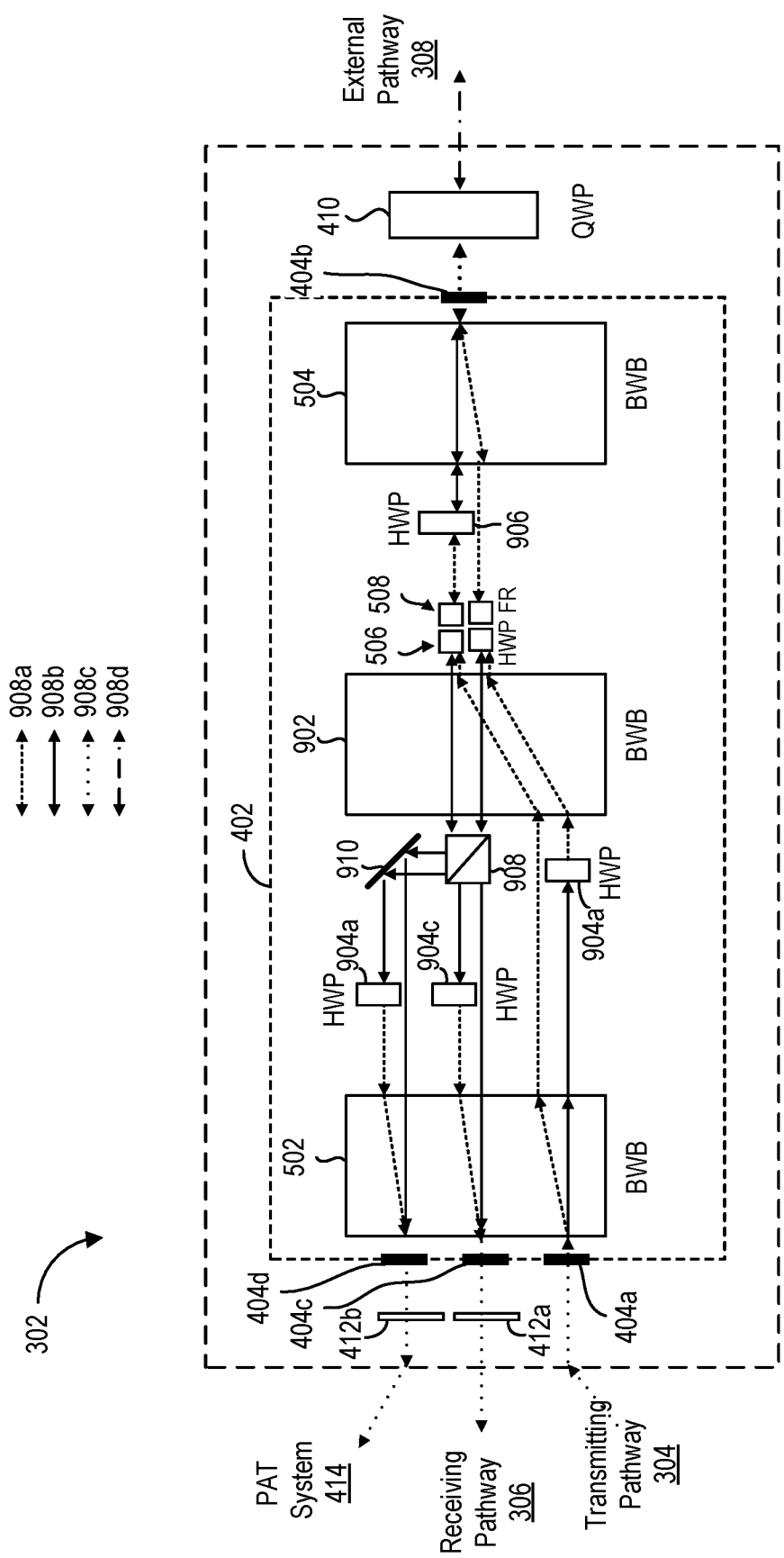
FIG. 9B shows another example optical bench assembly comprising a polarization insensitive optical circulator.

FIG. 9B illustrates another configuration of a polarization insensitive optical circulator 402, also including three walk-off blocks 502, 902 and 504. In this configuration, an additional HWP 904a, polarization beam splitter 908 and reflecting mirror 910 are provided. In this manner, three signal paths are generated which feed respectively to the transmitting pathway 304, receiving pathway 304 and PAT system 414.

Figure 9C:
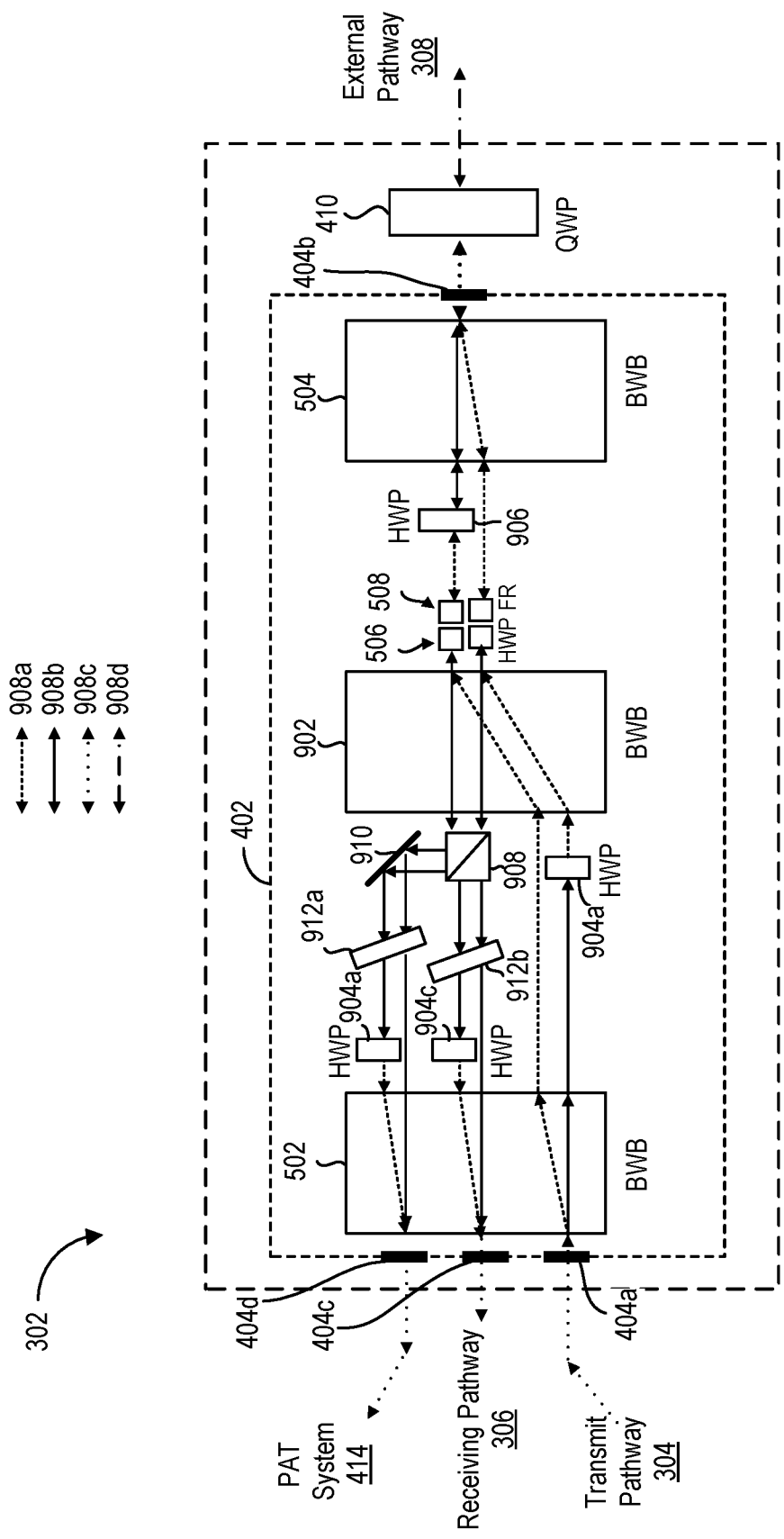
FIG. 9C shows still another example optical bench assembly comprising a polarization insensitive optical circulator.

FIG. 9C illustrates another configuration of a polarization insensitive optical circulator 402 which is analogous to the configuration in FIG. 9B, with the exception that the tunable wavelength components are now located within the optical circulator. As shown, tunable components 912a, 912b are interposed between walk-off blocks 502 and 902, and along the paths leading to the receiving pathway 306 and PAT system 414. For example, the tunable components 912a, 912b may be thin film tunable optical filters or embedded birefringent filters (e.g., Lyot-Ohman filters).

Figure 9D:
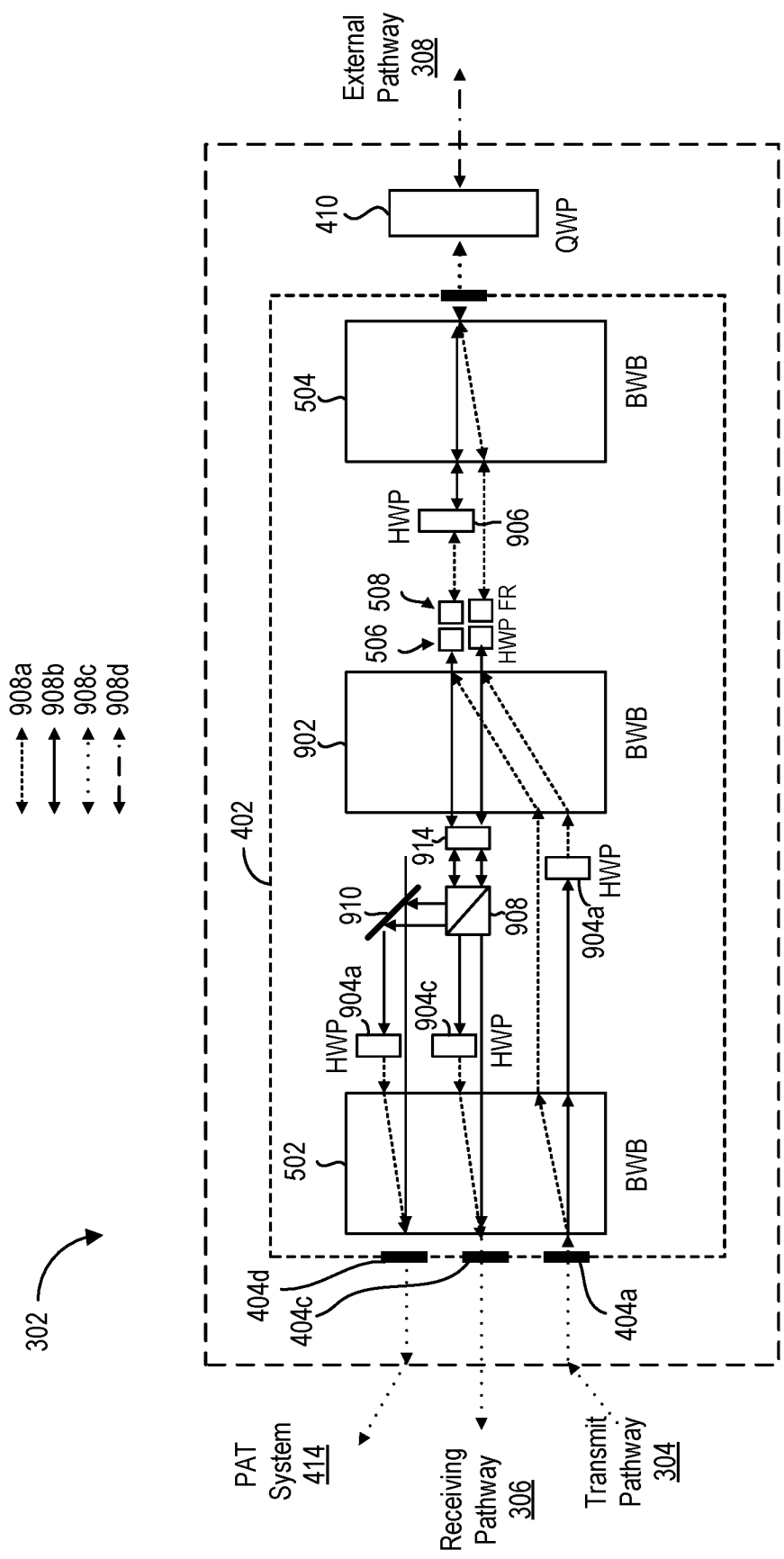
FIG. 9D shows still yet another example optical bench assembly comprising a polarization insensitive optical circulator.

FIG. 9D illustrates still another configuration of a polarization insensitive optical circulator 402 which is analogous to the configuration in FIG. 9B, with the exception that the tunable wavelength component 914 is positioned prior to the beam splitter 908 (e.g., an embedded bifringent notch filter).

Figures 10A, 10B:
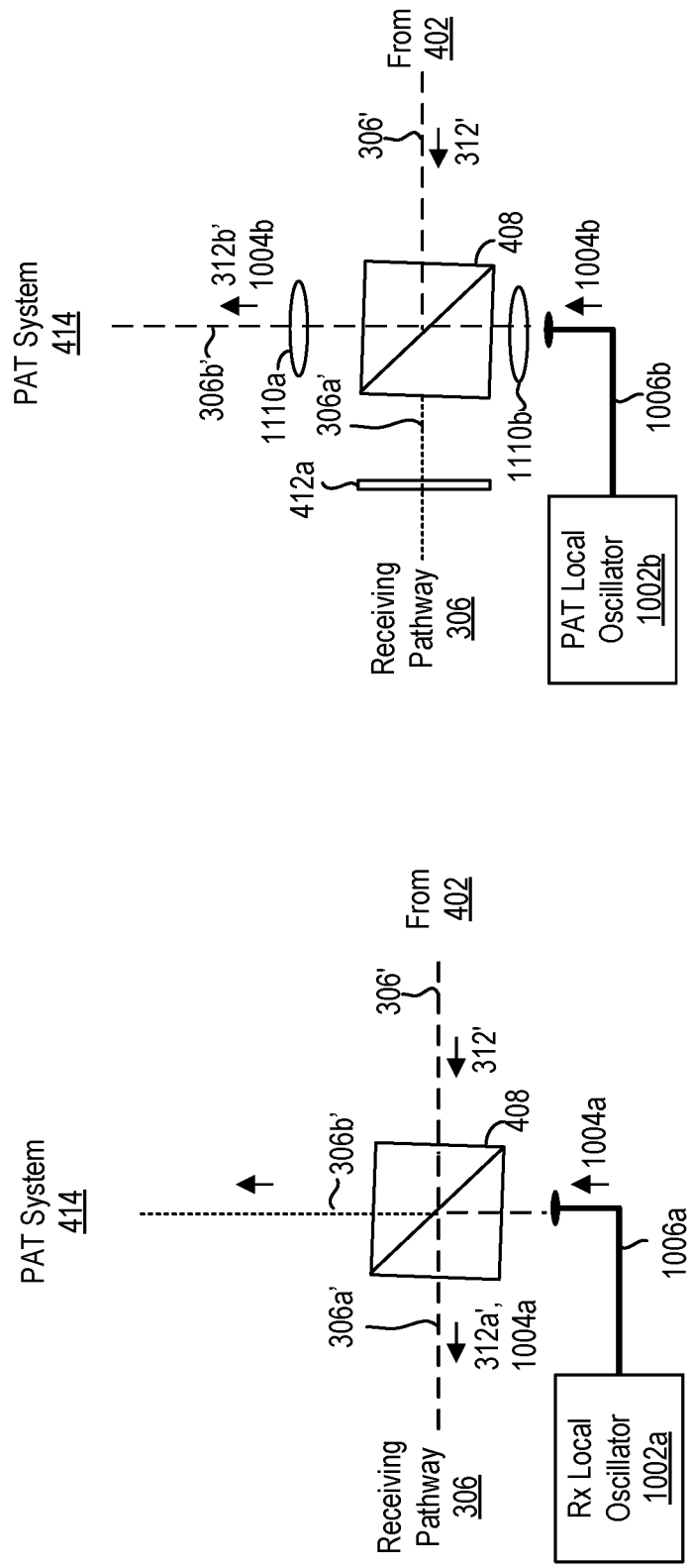
FIG. 10A illustrates the use with a heterodyne reception protocol for a system receiver.
FIG. 10B illustrates the use with a heterodyne reception protocol for a Position, Acquisition and Tracking (ATS) system.

Reference is now made to FIGS. 10A and 10B, which illustrate an alternative configuration for isolating individual wavelengths in the receiving path 306'. In this case, the filtering is performed using a heterodyne reception protocol with local oscillators to amplify selected incoming wavelengths at the detector.

In FIG. 10A, the tunable filter along the receiving pathway 306 (i.e., 412a) may be removed by using a heterodyne reception protocol. Using this protocol, a local oscillator 1002a (e.g., a tunable laser) is configured to beat with the received signal 312'. Accordingly, in these cases, other signals at different wavelengths (e.g., back-reflected transmitted signals, PAT signals) are filtered out as the beating signal 1004a would be outside the radiofrequency (RF) band of the receiver unit 350b.

In FIG. 10B, a similar method can be used for PAT signals 312b', whereby to remove the tunable narrow-band optical filter (i.e., filter 412b), a local oscillator 1004b is configured to beat with the PAT signal 312b' such that a beat signal 1004b is detected at a substantially lower frequency than the input optical signals (e.g., in the kHz rather than the THz range). This beat signal recorded by the PAT sensor may then be filtered using conventional radio frequency (RF) or digital signal processing techniques, thereby replicating the functionality of the original tunable narrow-band optical filter. This requires a fine tuning of the local oscillator 1004b such that the beating signal falls within the electrical bandwidth of the Acquisition and Tracking Sensor (ATS) in the PAT system 414.

In at least some example cases, the wavelength of the tunable laser is controlled to track the drift in the received signal wavelength such that the beat signal remains within the 200 kHz bandwidth of the PAT readout circuit. The tunability of the oscillators 1002a, 1002b may be controlled by controller 360.

In some cases, the light beam 1004b from the local oscillator may be partially collimated and mixed with the collimated PAT signal 312' (e.g., using collimators 1110a, 1110b), such that irrespective of the incoming angle of the PAT signal 312', there is enough coherent beating between the PAT signal 312' and the local oscillator signal 1004b.

To this end, the local oscillator (e.g., tunable laser) 1002a, 1002b may be introduced directly or connected to a respective optical fiber 1006a, 1006b. Further, both oscillators 1002a, 1002b and corresponding fibers, etc. may exist within the same system.

Figure 11:
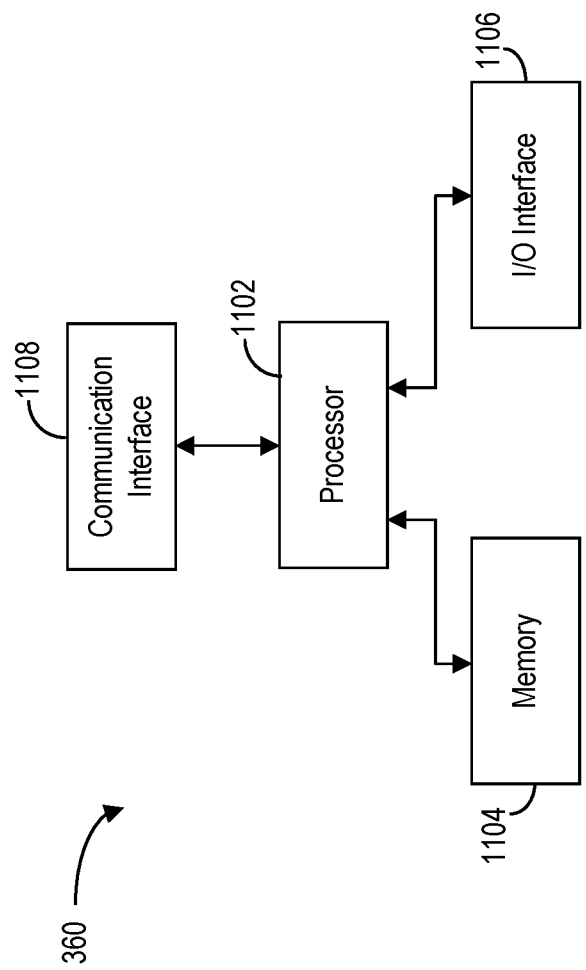
FIG. 11 shows a simplified block diagram of an example controller.

Reference is now made to FIG. 11, which shows a simplified block diagram of an example controller 360.

As shown, controller 360 may include a processor 1102 coupled, via a data bus, to one or more of memory 1104, an input/output (I/O) interface 1106 and a communication interface 1108.

Processor 1102 is a computer processor, such as a general-purpose microprocessor. In some other cases, processor 1102 may be a field programmable gate array, application specific integrated circuit, microcontroller, or other suitable computer processor. In some cases, processor 1102 may comprise multiple processors.

Processor 1102 is coupled, via a computer data bus, to memory 1104. Memory 1104 may include both volatile and non-volatile memory. Non-volatile memory stores computer programs consisting of computer-executable instructions, which may be loaded into volatile memory for execution by processor 1104 as needed. It will be understood by those of skill in the art that references herein to controller 360 as carrying out a function or acting in a particular way imply that processor 1102 is executing instructions (e.g., a software program) stored in memory 1104 and possibly transmitting or receiving inputs and outputs via one or more interface. Memory 1104 may also store data input to, or output from, processor 1102 in the course of executing the computer-executable instructions.

I/O interface 1106 can be used to couple the controller 360 to other external systems and devices, such as to one or more of the tunable components 412, 412a, 412b, 912a, 912b, 914, 1002a and 1002b.

Communication interface 1108 may be any interface that enables reception and transmission of data.

As discussed above, the controller 360 can be used to adjust various tunable components in the optical bench assembly 306 (e.g., 412, 412a, 412b, 912a, 912b, 914, 1002a and 1002b). In particular, these tunable components are used to filter for a specific passband range of wavelengths, corresponding to the received signal. In the case of a tunable bandpass filter, the controller 360 is able to modify the center passband wavelength across the wavelength band.

To this end, in at least some example cases, the controller 360 may vary the center passband wavelength (i.e., of a tunable component) to a first center passband wavelength to accommodate received signals from a first communication terminal, and may at a subsequent time instance, vary the center passband wavelength to a second center passband wavelength to accommodate received signals from a second communication terminal (i.e., which is transmitting at a different wavelength).

Controller 360 may determine the appropriate passband range for the received signals using various techniques. For example, the passband range may be simply known in advance by the controller 360 for each partner satellite. For example, the memory 1104 may store a database of different passband range parameters (or wavelength transmission parameters) in association with different satellites.

In another example case, an initial handshake protocol between two communicating terminals may occur in which the terminal, containing controller 360, may determine the transmission wavelength of a partner terminal. For example, the initial handshake protocol can be used to establish a communication wavelength from the partner satellite. In other cases, the handshake protocol can enable the partner satellite to simply identify itself, such that the controller 360 can reference the internal database, in memory 1104, to determine the associated transmission wavelength or passband of that satellite. Controller 360 can then vary the passband range of the tunable components to accommodate for the wavelength of the anticipated received signal. The controller 360 may also then perform a second handshake protocol with another terminal to determine its transmission wavelength, and may again vary the passband range of the tunable components to accommodate for the wavelength of the received signals from that terminal, and so forth. In other cases, to enable communication with multiple terminals, the controller 360 may adjust the passband range to accommodate multiple received wavelengths from different terminals.

In other cases, when communication is initiated with another satellite, the controller 360 may adjust different center passband wavelength of the tunable component to scan for the received signal. Once a signal is detected, the controller 360 may lock that center passband frequency in association with the tunable component. In some cases, the controller 360 may then record the locked center passband wavelength in memory 1104 in association with a given partner satellite, i.e., for future use and reference.

It will be understood that a similar tuning process can be used to tune other components, e.g., a local oscillator, as described previously.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An optical communication system, comprising:
an optical bench coupling an optical transmit pathway and an optical receiving pathway to an external pathway, the optical bench comprising:
an optical circulator comprising a first port, a second port and a third port, wherein the first port is coupled to the optical transmit pathway, the second port is coupled to the external pathway, and the third port is coupled to the optical receiver pathway, wherein the optical circulator is polarization insensitive and is configured to:
route a transmitted signal from the first port to the second port, irrespective of the polarization state of the transmitted signal; and route a received signal from the second port to the third port, irrespective of the polarization state of the received signal, a tunable component positioned along the optical receiving pathway, wherein the tunable component is operable to enable a first specified subset of wavelengths of the received signal to proceed downstream and to prevent a second subset of wavelengths of the received signal from proceeding downstream; and a controller coupled to the tunable component, wherein the controller is configured to tune the tunable component to define the first specified subset of wavelengths to correspond to an expected wavelength range corresponding to an external communication terminal coupled to the external pathway from which the received signal is received.

2. The system of claim 1, wherein the external pathway comprises external optical elements that reflect a portion of the transmit signal back towards the external pathway.

3. The system of claim 2, wherein the optical bench provides greater than 30 dB isolation between the receive signal and the back reflected transmit signal, and provides greater than 50 dB isolation between the optical transmit pathway and the optical receiving pathway.

4. The system of claim 2, wherein the external optical elements comprise a fine steering mirror, a coarse pointing assembly, and a beam magnification telescope.

5. The system of claim 2, wherein the external optical elements comprises a quarter wave plate.

6. The system of claim 1, further comprising an optical transmitter coupled to the optical transmit pathway, wherein the optical transmitter is configured to transmit a transmit signal at a first wavelength.

7. The system of claim 1, further comprising an optical receiver coupled to an optical receiving pathway, wherein the optical receiver is configured to receive a receive signal at a second wavelength.

8. The system of claim 1, wherein the tunable component comprises a tunable optical bandpass filter.

9. The system of claim 8, wherein the tunable optical bandpass filter can be tuned across a wavelength band corresponding to the expected wavelength range.

10. The system of claim 9, wherein the controller is configured to vary the center passband wavelength across the wavelength band.

11. The system of claim 1, wherein the tunable component comprises a local oscillator.

12. The system of claim 11, wherein the local oscillator comprises a tunable laser.

13. The system of claim 1, wherein the optical circulator comprises a first walk off block, a second walk off block, and one or more polarization rotating elements and non-reciprocal polarizers positioned between the first and second walk off blocks.

14. The system of claim 13, wherein the one or more polarization rotating elements comprise half wave plates.

15. The system of claim 13, wherein the one or more non-reciprocal polarizers comprise faraday rotators.

* * * * *